(12) United States Patent
Losh et al.

(10) Patent No.: US 9,152,495 B2
(45) Date of Patent: Oct. 6, 2015

(54) MANAGING NON-VOLATILE MEDIA USING MULTIPLE ERROR CORRECTING CODES

(71) Applicant: Fusion-io, Inc., Salt Lake City, UT (US)

(72) Inventors: Warner Losh, Broomfield, CO (US); James Peterson, San Jose, CA (US)

(73) Assignee: SanDisk Technologies, Inc., Plano, TX (US)

( * ) Notice: Subject to any disclaimer, the term of this patent is extended or adjusted under 35 U.S.C. 154(b) by 162 days.

(21) Appl. No.: 14/076,579

(22) Filed: Nov. 11, 2013

(65) Prior Publication Data

US 2015/0012794 A1 Jan. 8, 2015

Related U.S. Application Data

(60) Provisional application No. 61/842,884, filed on Jul. 3, 2013.

(51) Int. Cl.
*G11C 29/00* (2006.01)
*H03M 13/00* (2006.01)
*G06F 11/10* (2006.01)
*G06F 3/06* (2006.01)

(52) U.S. Cl.
CPC .......... *G06F 11/1008* (2013.01); *G06F 3/0614* (2013.01)

(58) Field of Classification Search
CPC . G06F 11/1008; G06F 3/0614; G06F 3/0679; H03M 1/00
USPC .................. 714/773, 774, 763, 752
See application file for complete search history.

(56) References Cited

U.S. PATENT DOCUMENTS

| | | | |
|---|---|---|---|
| 7,904,780 B2 * | 3/2011 | Brandman | 714/752 |
| 8,560,900 B1 * | 10/2013 | Bellorado et al. | 714/718 |
| 8,793,558 B2 * | 7/2014 | Cunningham et al. | 714/774 |
| 2011/0252289 A1 * | 10/2011 | Patapoutian et al. | 714/763 |
| 2012/0239868 A1 | 9/2012 | Ryan et al. | |

* cited by examiner

*Primary Examiner* — Christine Tu
(74) *Attorney, Agent, or Firm* — Kunzler Law Group, PC

(57) ABSTRACT

Apparatuses, systems, and methods are disclosed for managing non-volatile a medium. A method includes determining whether a first error correcting code (ECC) code word of a non-volatile storage device is correctable using a first error correcting code. A method includes determining whether a second ECC code word is correctable using a second error correcting code in response to determining that a first ECC code word is uncorrectable using a first error correcting code. A method includes adjusting one or more media parameters for accessing a non-volatile medium of a non-volatile storage device based on error information. Error information may include information from a decoder for a second error correcting code. Adjusting one or more media parameters may be in response to determining that a second ECC code word is correctable using a second error correcting code.

20 Claims, 9 Drawing Sheets

MANAGING NON-VOLATILE MEDIA USING MULTIPLE ERROR CORRECTING CODES

CROSS-REFERENCES TO RELATED APPLICATIONS

This application claims the benefit of U.S. Provisional Patent Application No. 61/842,884 entitled "Managing Non-Volatile Media Using Multiple Error Correcting Codes" and filed on Jul. 3, 2013 for Warner Losh, et al., which is incorporated herein by reference.

TECHNICAL FIELD

The present disclosure, in various embodiments, relates to non-volatile media and more particularly relates to using multiple error correcting codes for data stored by non-volatile media.

BACKGROUND

Several types of data storage devices, such as Flash memory devices, store data in cells of non-volatile media. A physical property of each cell, such as a stored charge, material phase, electrical resistance, magnetization, or the like, is alterable to encode data. Parameters for the non-volatile media may define how a storage device stores data in the cells. For example, a storage device may use one or more read voltage thresholds, resistivity thresholds, or the like to separate the range of possible values for the physical property of a cell into discrete states, so that each state encodes a possible data value.

An error may occur if the stored value for a cell drifts past a threshold parameter from one state into an adjacent state due to cell damage, cell leakage, temperature effects, or other disturbances. Leakage and other disturbances may increase with age as storage cells are used over time. So, over time, different parameters may become more optimal for the storage cells, in order to avoid errors. Error correcting codes may also compensate for some errors in data.

Error rates may increase, though, as storage density increases, because shrinking feature sizes for storage cells make the cells more susceptible to disturbances, and because increasing the number of states per cell increases the likelihood that a disturbance will change the state of a cell. Stronger error correcting codes may compensate for increased error rates, but may also may also increase the computational and storage overhead associated with encoding, storing, and decoding data.

SUMMARY

Methods are presented for managing non-volatile media. In one embodiment, a method includes determining whether a first error correcting code (ECC) code word of a non-volatile storage device is correctable using a first error correcting code. In a further embodiment, a method includes determining whether a second ECC code word is correctable using a second error correcting code. In a certain embodiment, determining whether the second ECC code word is correctable using the second error correcting code is in response to determining that the first ECC code word is uncorrectable using the first error correcting code. In some embodiments, a method includes adjusting one or more media parameters for accessing a non-volatile medium of the non-volatile storage device based on error information. In certain embodiments, the error information includes information from a decoder for the second error correcting code. In further embodiments, adjusting the one or more media parameters is in response to determining that the second ECC code word is correctable using the second error correcting code.

Apparatuses are presented for managing non-volatile media. In one embodiment, a secondary ECC module is configured to decode at least one error correcting code (ECC) block of a non-volatile memory device using a secondary error correcting code. In some embodiments, an adjustment module is configured to determine one or more media parameters based on decoding at least one ECC block. One or more media parameters, in one embodiment, are for reading one or more additional ECC blocks from a non-volatile memory device. A primary ECC module, in certain embodiments, is configured to decode one or more additional ECC blocks of a non-volatile memory device using a primary error correcting code, and the one or more additional ECC blocks are read using one or more media parameters.

In one embodiment, an apparatus includes means for determining whether an error correcting code (ECC) chunk is correctable using a repetition error correcting code. An apparatus, in another embodiment, includes means for deriving analog information from repeated messages of a repetition error correcting code in response to determining that an ECC chunk is uncorrectable using the repetition error correcting code. In a further embodiment, an apparatus includes means for determining whether an ECC chunk is correctable using a second error correcting code. Analog information, in certain embodiments, is used to inform a decoder for a second error correcting code.

A system is presented for managing non-volatile media. In one embodiment, a non-volatile recording device is in communication with a host device over a communications bus. In a certain embodiment, a primary ECC module is configured to determine first error information using a first error correcting code to attempt to decode at least one error correcting code (ECC) code word of a non-volatile recording device. In a further embodiment, a secondary ECC module is configured to determine second error information using a second error correcting code to attempt to decode the at least one ECC code word. In certain embodiments, the second error correcting code is different from the first error correcting code. In some embodiments, an adjustment module is configured to adjust one or more media parameters for accessing a non-volatile medium of the non-volatile recording device based on error information. In further embodiments, the error information includes the first error information and/or the second error information.

A computer program product is presented to perform operations for managing non-volatile media. In certain embodiments, the computer program product includes a computer readable storage medium storing computer usable program code executable to perform the operations of the computer program product. In one embodiment, the operations include determining outer error information using a primary error correcting code to attempt to decode an error correcting code (ECC) block of a non-volatile memory device. In a certain embodiment, the operations include determining inner error information using a secondary error correcting code to attempt to decode the ECC block. In a further embodiment, the secondary error correcting code is different from the primary error correcting code. In some embodiments, the operations include adjusting one or more media parameters for accessing a non-volatile medium of the non-volatile memory device based on error information. In further embodiments, the error information includes the outer error information and the inner error information.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1A:
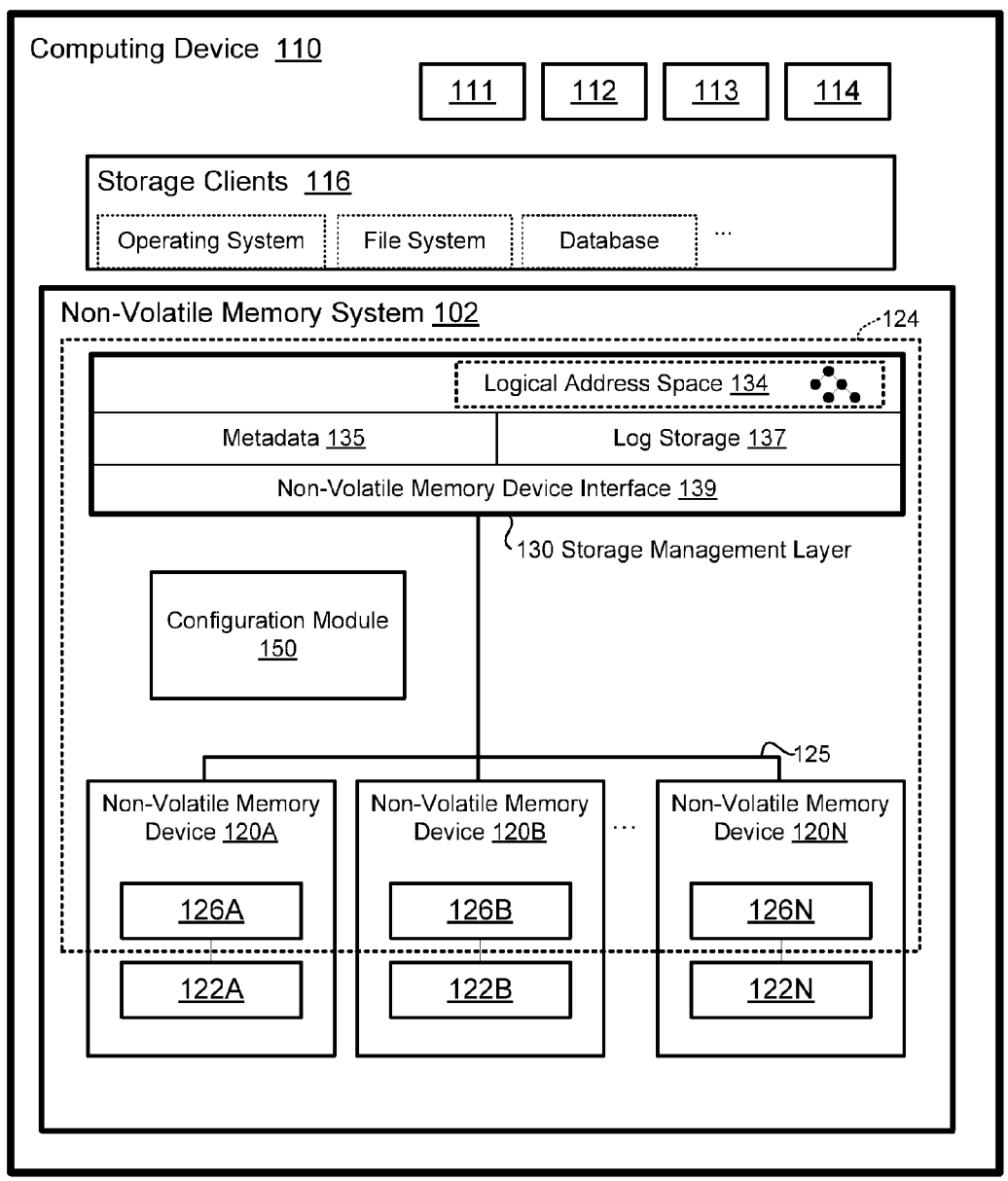
FIG. 1A is a schematic block diagram illustrating one embodiment of a non-volatile memory system comprising a configuration module.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

According to various embodiments, a non-volatile memory controller manages one or more non-volatile memory devices. The non-volatile memory device(s) may comprise memory or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device). Memory units may include, but are not limited to: pages, memory divisions, erase blocks, sectors, blocks, collections or sets of physical storage locations (e.g., logical pages, logical erase blocks, described below), or the like.

The non-volatile memory controller may comprise a storage management layer (SML), which may present a logical address space to one or more storage clients. One example of an SML is the Virtual Storage Layer® of Fusion-io, Inc. of Salt Lake City, Utah. Alternatively, each non-volatile memory device may comprise a non-volatile memory media controller, which may present a logical address space to the storage clients. As used herein, a logical address space refers to a logical representation of memory resources. The logical address space may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

The SML may maintain metadata, such as a forward index, to map logical addresses of the logical address space to media storage locations on the non-volatile memory device(s). The SML may provide for arbitrary, any-to-any mappings from logical addresses to physical storage resources. As used herein, an "any-to any" mapping may map any logical address to any physical storage resource. Accordingly, there may be no pre-defined and/or pre-set mappings between logical addresses and particular, media storage locations and/or media addresses. As used herein, a media address refers to an address of a memory resource that uniquely identifies one memory resource from another to a controller that manages a plurality of memory resources. By way of example, a media address includes, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML may map logical addresses to physical data resources of any size and/or granularity, which may or may not correspond to the underlying data partitioning scheme of the non-volatile memory device(s). For example, in some embodiments, the non-volatile memory controller is configured to store data within logical memory units that are formed by logically combining a plurality of physical memory units, which may allow the non-volatile memory controller to support many different virtual memory unit sizes and/or granularities.

As used herein, a logical memory element refers to a set of two or more non-volatile memory elements that are or are capable of being managed in parallel (e.g., via an I/O and/or control bus). A logical memory element may comprise a plurality of logical memory units, such as logical pages, logical memory divisions (e.g., logical erase blocks), and so on. As used herein, a logical memory unit refers to a logical construct combining two or more physical memory units, each physical memory unit on a respective non-volatile memory element in the respective logical memory element (each non-volatile memory element being accessible in parallel). As used herein, a logical memory division refers to a set of two or more physical memory divisions, each physical memory division on a respective non-volatile memory element in the respective logical memory element.

The logical address space presented by the storage management layer may have a logical capacity, which may correspond to the number of available logical addresses in the logical address space and the size (or granularity) of the data referenced by the logical addresses. For example, the logical capacity of a logical address space comprising 2^32 unique logical addresses, each referencing 2048 bytes (2KiB) of data may be 2^43 bytes. (As used herein, a kibibyte (KiB) refers to 1024 bytes). In some embodiments, the logical address space may be thinly provisioned. As used herein, a "thinly provisioned" logical address space refers to a logical address space having a logical capacity that exceeds the physical capacity of the underlying non-volatile memory device(s). For example, the storage management layer may present a 64-bit logical address space to the storage clients (e.g., a logical address space referenced by 64-bit logical addresses), which exceeds the physical capacity of the underlying non-volatile memory devices. The large logical address space may allow storage clients to allocate and/or reference contiguous ranges of logical addresses, while reducing the chance of naming conflicts. The storage management layer may leverage the any-to-any mappings between logical addresses and physical storage resources to manage the logical address space independently of the underlying physical storage devices. For example, the storage management layer may add and/or remove physical storage resources seamlessly, as needed, and without changing the logical addresses used by the storage clients.

The non-volatile memory controller may be configured to store data in a contextual format. As used herein, a contextual format refers to a self-describing data format in which persistent contextual metadata is stored with the data on the physical storage media. The persistent contextual metadata provides context for the data it is stored with. In certain embodiments, the persistent contextual metadata uniquely identifies the data that the persistent contextual metadata is stored with. For example, the persistent contextual metadata may uniquely identify a sector of data owned by a storage client from other sectors of data owned by the storage client. In a further embodiment, the persistent contextual metadata identifies an operation that is performed on the data. In a further embodiment, the persistent contextual metadata identifies a sequence of operations performed on the data. In a further embodiment, the persistent contextual metadata identifies security controls, a data type, or other attributes of the data. In a certain embodiment, the persistent contextual metadata identifies at least one of a plurality of aspects, including data type, a unique data identifier, an operation, and a sequence of operations performed on the data. The persistent contextual metadata may include, but is not limited to: a logical address of the data, an identifier of the data (e.g., a file name, object id, label, unique identifier, or the like), reference(s) to other data (e.g., an indicator that the data is associated with other data), a relative position or offset of the data with respect to other data (e.g., file offset, etc.), data size and/or range, and the like. The contextual data format may comprise a packet format comprising a data segment and one or more headers. Alternatively, a contextual data format may associate data with context information in other ways (e.g., in a dedicated index on the non-volatile memory media, a memory division index, or the like).

In some embodiments, the contextual data format may allow data context to be determined (and/or reconstructed) based upon the contents of the non-volatile memory media, and independently of other metadata, such as the arbitrary, any-to-any mappings discussed above. Since the media location of data is independent of the logical address of the data, it may be inefficient (or impossible) to determine the context of data based solely upon the media location or media address of the data. Storing data in a contextual format on the non-volatile memory media may allow data context to be determined without reference to other metadata. For example, the contextual data format may allow the metadata to be reconstructed based only upon the contents of the non-volatile memory media (e.g., reconstruct the any-to-any mappings between logical addresses and media locations).

In some embodiments, the non-volatile memory controller may be configured to store data on one or more asymmetric, write-once media, such as solid-state storage media. As used herein, a "write once" storage medium refers to a storage medium that is reinitialized (e.g., erased) each time new data is written or programmed thereon. As used herein, an "asymmetric" storage medium refers to a storage medium having different latencies for different storage operations. Many types of solid-state storage media are asymmetric; for example, a read operation may be much faster than a write/program operation, and a write/program operation may be much faster than an erase operation (e.g., reading the media may be hundreds of times faster than erasing, and tens of times faster than programming the media). The memory media may be partitioned into memory divisions that can be erased as a group (e.g., erase blocks) in order to, inter alia, account for the asymmetric properties of the media. As such, modifying a single data segment in-place may require erasing the entire erase block comprising the data, and rewriting the modified data to the erase block, along with the original, unchanged data. This may result in inefficient "write amplification," which may excessively wear the media. Therefore, in some embodiments, the non-volatile memory controller may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (the erasure latency is no longer part of the critical path of a write operation).

The non-volatile memory controller may comprise one or more processes that operate outside of the regular path for servicing of storage operations (the "path" for performing a storage operation and/or servicing a storage request). As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client, identifying the logical addresses of the request, performing one or more storage operations on non-volatile memory media, and returning a result, such as acknowledgement or data. Processes that occur outside of the path for servicing storage requests may include, but are not limited to: a groomer, de-duplication, and so on. These processes may be implemented autonomously and in the background, so that they do not interfere with or impact the performance of other storage operations and/or requests. Accordingly, these processes may operate independent of servicing storage requests.

In some embodiments, the non-volatile memory controller comprises a groomer, which is configured to reclaim memory divisions (e.g., erase blocks) for reuse. The write out-of-place paradigm implemented by the non-volatile memory controller may result in obsolete or invalid data remaining on the non-volatile memory media. For example, overwriting data X with data Y may result in storing Y on a new memory division (rather than overwriting X in place), and updating the any-to-any mappings of the metadata to identify Y as the valid, up-to-date version of the data. The obsolete version of the data X may be marked as invalid, but may not be immediately removed (e.g., erased), since, as discussed above, erasing X may involve erasing an entire memory division, which is a time-consuming operation and may result in write amplification. Similarly, data that is no longer is use (e.g., deleted or trimmed data) may not be immediately removed. The non-volatile memory media may accumulate a significant amount of invalid data. A groomer process may operate outside of the critical path for servicing storage operations. The groomer process may reclaim memory divisions so that they can be reused for other storage operations. As used herein, reclaiming a memory division refers to erasing the memory division so that new data may be stored/programmed thereon. Reclaiming a memory division may comprise relocating valid data on the memory division to a new location. The groomer may identify memory divisions for reclamation based upon one or more factors, which may include, but are not limited to: the amount of invalid data in the memory division, the amount of valid data in the memory division, wear on the memory division (e.g., number of erase cycles), time since the memory division was programmed or refreshed, and so on.

The non-volatile memory controller may be further configured to store data in a log format. As described above, a log format refers to a data format that defines an ordered sequence of storage operations performed on a non-volatile memory media. In some embodiments, the log format comprises storing data in a pre-determined sequence of media addresses of the non-volatile memory media (e.g., within sequential pages and/or erase blocks of the media). The log format may further comprise associating data (e.g., each packet or data segment) with respective sequence indicators. The sequence indicators may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are first used to store data.

In some embodiments the log format may comprise storing data in an "append only" paradigm. The non-volatile memory controller may maintain a current append point at a media address of the non-volatile memory device. The append point may be a current memory division and/or offset within a memory division. Data may then be sequentially appended from the append point. The sequential ordering of the data, therefore, may be determined based upon the sequence indicator of the memory division of the data in combination with the sequence of the data within the memory division. Upon reaching the end of a memory division, the non-volatile memory controller may identify the "next" available memory division (the next memory division that is initialized and ready to store data). The groomer may reclaim memory divisions comprising invalid, stale, and/or deleted data, to ensure that data may continue to be appended to the media log.

The log format described herein may allow valid data to be distinguished from invalid data based upon the contents of the non-volatile memory media, and independently of other metadata. As discussed above, invalid data may not be removed from the non-volatile memory media until the memory division comprising the data is reclaimed. Therefore, multiple "versions" of data having the same context may exist on the non-volatile memory media (e.g., multiple versions of data having the same logical addresses). The sequence indicators associated with the data may be used to distinguish invalid versions of data from the current, up-to-date version of the data; the data that is the most recent in the log is the current version, and previous versions may be identified as invalid.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description.

FIG. 1A is a block diagram of one embodiment of a system 100 comprising a configuration module 150. The configuration module 150 may be part of and/or in communication with a storage management layer (SML) 130. The SML 130 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 (and/or non-volatile memory controller 124) to a communication network, such as a Internet Protocol network, a Storage Area Network, or the like.

The computing device 110 may further comprise a non-transitory, computer readable storage media 114. The computer readable storage media 114 may comprise executable instructions configured to cause the computing device 110 (e.g., processor 111) to perform steps of one or more of the methods disclosed herein. Alternatively, or in addition, the storage management layer 130 and/or one or more modules thereof may be embodied as one or more computer readable instructions stored on the non-transitory storage media 114.

The storage management layer 130 may be configured to provide storage services to one or more storage clients 116. The storage clients 116 may include local storage clients 116 operating on the computing device 110 and/or remote, storage clients 116 accessible via the network (and network interface 113). The storage clients 116 may include, but are not limited to: operating systems, file systems, database applications, server applications, kernel-level processes, user-level processes, applications, and the like.

Figure 1B:
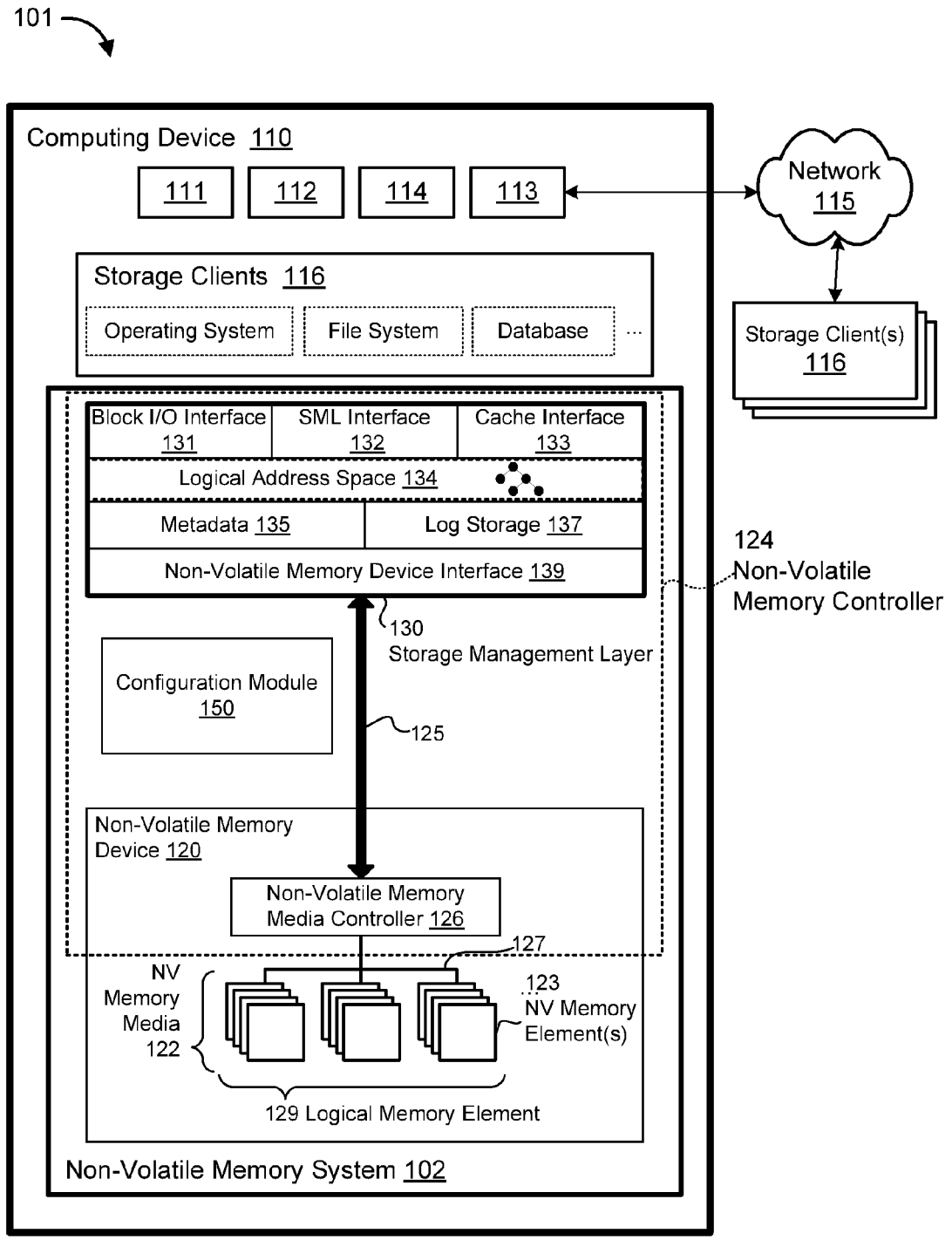
FIG. 1B is a schematic block diagram illustrating another embodiment of a non-volatile memory system comprising a configuration module.

The storage management layer 130 comprises and/or is communicatively coupled to one or more non-volatile memory devices 120A-N. The non-volatile memory devices 120A-N may include different types of non-volatile memory devices including, but not limited to: solid-state storage devices, hard drives, SAN storage resources, or the like. The non-volatile memory devices 120A-N may comprise respective non-volatile memory media controllers 126A-N and non-volatile memory media 122A-N. As illustrated in FIG. 1B, The SML 130 may provide access to the non-volatile memory devices 120A-N via a traditional block I/O interface 131. Additionally, the SML 130 may provide access to enhanced functionality (large, virtual address space) through the SML interface 132. The metadata 135 may be used to manage and/or track storage operations performed through any of the Block I/O interface 131, SML interface 132, cache interface 133, or other, related interfaces.

The cache interface 133 may expose cache-specific features accessible via the storage management layer 130. Also, in some embodiments, the SML interface 132 presented to the storage clients 116 provides access to data transformations implemented by the non-volatile memory devices 120A-N and/or the non-volatile memory media controllers 126A-N.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations on one or more of the non-volatile memory devices 120A-N. The SML 130 may maintain metadata 135 comprising any-to-any mappings between logical addresses and media locations, as described above.

The SML 130 may further comprise a log storage module 137 that is configured to store data in a contextual, log format. The contextual, log data format may comprise associating data with persistent contextual metadata, such as the logical address of the data, or the like. The contextual, log format may further comprise associating data with respective sequence identifiers on the non-volatile memory media 122A-N, which define an ordered sequence of storage operations performed on the non-volatile memory devices 120A-N, as described above.

The SML 130 may further comprise a non-volatile memory device interface 139 configured to transfer data, commands, and/or queries to the non-volatile memory devices 120A-N over a bus 125, which may include, but is not limited to: a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network, Infiniband, SCSI RDMA, or the like. The non-volatile memory device interface 139 may communicate with the non-volatile memory devices 120A-N using input-output control (IO-CTL) command(s), IO-CTL command extension(s), remote direct memory access, or the like.

The non-volatile memory system 102, in the depicted embodiment, includes a configuration module 150. The configuration module 150, in one embodiment, is configured to determine whether an error correcting code (ECC) chunk or ECC block for the non-volatile memory device 120 is correctable using a primary or first error correcting code. If the ECC chunk or block is not correctable using the primary error correcting code, the configuration module 150 determines whether the ECC chunk or block is correctable using a secondary or second error correcting code different from the primary error correcting code. If the ECC chunk or block is correctable using the secondary error code, the configuration module 150 uses error information from a decoder for the secondary error correcting code to adjust media parameters for accessing the non-volatile memory media 122. Adjusting media parameters based on multiple levels of error correcting codes for at least one ECC chunk or block allows the non-volatile memory device 120 to store and/or retrieve additional ECC chunks or blocks using a weaker error correcting code (e.g., a code that uses less computational or storage overhead than would otherwise be used, to provide sufficient levels of correctability for the additional ECC chunks or blocks).

In one embodiment, the configuration module 150 may comprise executable software code, such as a device driver, SML 130, or the like, stored on the computer readable storage media 114 for execution on the processor 111. In another embodiment the configuration module 150 may comprise logic hardware of one or more of the non-volatile memory devices 120A-N, such as a non-volatile memory media controller 126A-N, a non-volatile memory controller 124, a device controller, a field-programmable gate array (FPGA) or other programmable logic, firmware for an FPGA or other programmable logic, microcode for execution on a microcontroller, an application-specific integrated circuit (ASIC), or the like. In a further embodiment, the configuration module 150 may include a combination of both executable software code and logic hardware.

In one embodiment, the configuration module 150 is configured to adjust media parameters for the non-volatile memory media 122 in response to receiving a storage request from the SML 130 via a bus 125 or the like. The configuration module 150 may be further configured to transfer data to/from the SML 130 and/or storage clients 116 via the bus 125. Accordingly, the configuration module 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the configuration module 150 may receive storage requests as an API call from a storage client 116, as an IO-CTL command, or the like. The configuration module 150 is described in greater detail below with regard to FIGS. 3 and 4.

FIG. 1B is a block diagram of another embodiment of a system 101 comprising a configuration module 150. As described above, the configuration module 150 may be part of and/or in communication with a storage management layer 130. The SML 130 may operate on a non-volatile memory system 102 of a computing device 110, which, as discussed above, may comprise a processor 111, volatile memory 112, communication interface 113, and non-transitory, computer readable storage media 114. The communication interface 113 may comprise one or more network interfaces configured to communicatively couple the computing device 110 (and/or non-volatile memory controller 124) to a network 115 and/or to one or more remote, network-accessible storage clients 116.

The computing device 110 may comprise a non-volatile memory controller 124 that is configured to provide storage services to the storage clients 116. The storage clients 116 may include local storage clients 116 operating on the computing device 110 and/or remote, storage clients 116 accessible via the network 115 (and network interface 113). The non-volatile memory controller 124 comprises one or more non-volatile memory devices 120. Although FIG. 1B depicts a single non-volatile memory device 120, the disclosure is not limited in this regard and could be adapted to incorporate any number of non-volatile memory devices 120.

The non-volatile memory device 120 may comprise non-volatile memory media 122, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like. While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, and the like. A non-volatile memory media controller 126 may be configured to manage storage operations on the non-volatile memory media 122, and may comprise one or more processors, programmable processors (e.g., field-programmable gate arrays), or the like. In some embodiments, the non-volatile memory media controller 126 is configured to store data on (and read data from) the non-volatile memory media 122 in the contextual, log format described above, and to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory media 122 comprises twenty-five (25) non-volatile memory elements, each logical memory unit may comprise twenty-five (25) pages (a page of each element of non-volatile memory media 122).

The non-volatile memory controller 124 may comprise a SML 130 and the non-volatile memory media controller 126. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile memory system 102.

As described above, the SML 130 may present a logical address space 134 to the storage clients 116 (through the interfaces 131, 132, and/or 133). The SML 130 may maintain metadata 135 comprising any-to-any mappings between logical addresses in the logical address space 134 and media locations on the non-volatile memory device 120. The metadata 135 may comprise a logical-to-physical mapping structure with entries that map logical addresses in the logical address space 134 and media locations on the non-volatile memory device 120. The logical-to-physical mapping structure of the metadata 135, in one embodiment, is sparsely populated, with entries for logical addresses for which the non-volatile memory device 120 stores data and with no entries for logical addresses for which the non-volatile memory device 120 does not currently store data. The metadata 135, in certain embodiments, tracks data at a block level, with the SML 130 managing data as blocks.

The non-volatile memory system 102 may further comprise a log storage module 137, which, as described above, may be configured to store data on the non-volatile memory device 120 in a contextual, log format. The contextual, log data format may comprise associating data with a logical address on the non-volatile memory media 122. The contextual, log format may further comprise associating data with respective sequence identifiers on the non-volatile memory media 122, which define an ordered sequence of storage operations performed on the non-volatile memory media 122, as described above. The non-volatile memory controller 124 may further comprise a non-volatile memory device interface 139 that is configured to transfer data, commands, and/or queries to the non-volatile memory media controller 126 over a bus 125, as described above.

Figure 2:
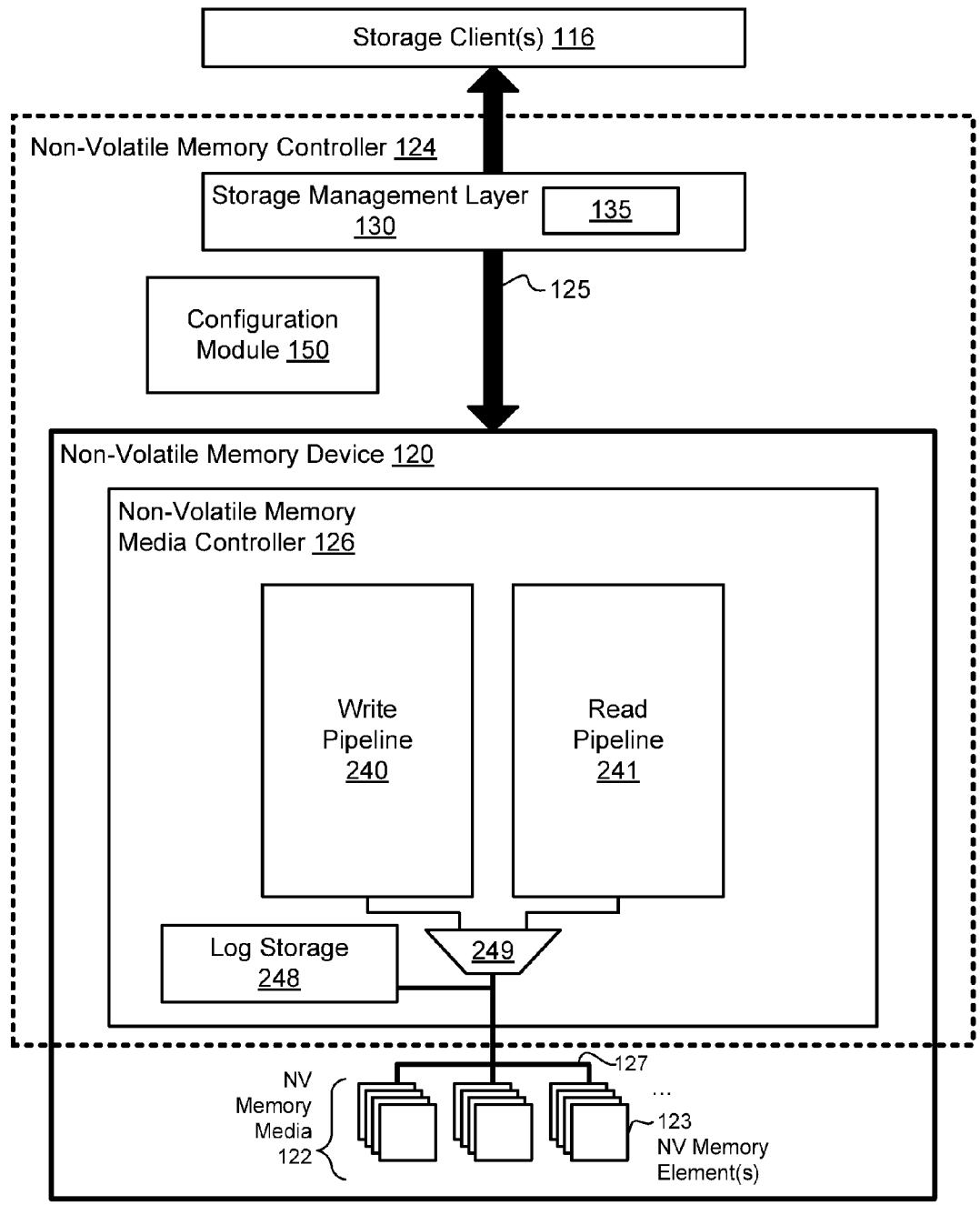
FIG. 2 is a schematic block diagram illustrating a further embodiment of a non-volatile memory system comprising a configuration module.

FIG. 2 depicts another embodiment of a non-volatile memory controller 124 configured to adjust media parameters for non-volatile memory media 122. The non-volatile memory device 120 may comprise a non-volatile memory media controller 126 and non-volatile memory media 122. The non-volatile memory media 122 may comprise a plurality of non-volatile memory elements 123, which may be communicatively coupled to the non-volatile memory media controller 126 via a bus 127, as described above.

The non-volatile memory media controller 126 may comprise a write pipeline 240 that is configured to store data on the non-volatile memory media 122 in a contextual format in response to requests received via the bus 125. The requests may include and/or reference data to be stored on the non-volatile memory media 122, may include logical address(es) of the data, and so on. As described above, the contextual format may comprise storing a logical address of the data in association with the data on the non-volatile memory media 122. For example, the write pipeline 240 may be configured to format data into packets, and may include the logical address of the data in a packet header (or other packet field). The write pipeline 240 may be configured to buffer data for storage on the non-volatile memory media 122. In some embodiments, the write pipeline 240 may comprise one or more synchronization buffers to synchronize a clock domain of the non-volatile memory media controller 126 with a clock domain of the non-volatile memory media 122 (and/or bus 127).

The log storage module 248 may be configured to select media location(s) for the data and may provide addressing and/or control information to the non-volatile memory elements 123 via the bus 127. In some embodiments, the log storage module 248 is configured to store data sequentially in a log format within the non-volatile memory media. The log storage module 248 may be further configured to groom the non-volatile memory media, as described above. In certain embodiments the log storage module 248 is substantially similar to the log storage module 137 as described above. The log storage module 248 may be executed by the SML 130 and/or by the non-volatile memory media controller 126.

Upon writing data to the non-volatile memory media, the non-volatile memory media controller 126 may be configured to update metadata 135 (e.g., a forward index) to associate the logical address(es) of the data with the media address(es) of the data on the non-volatile memory media 122. In some embodiments, the metadata 135 may be maintained on the non-volatile memory media controller 126; for example, the metadata 135 may be stored on the non-volatile memory media 122, on a volatile memory (not shown), or the like. Alternatively, or in addition, the metadata 135 may be maintained within the SML 130 (e.g., on a volatile memory 112 of the computing device 110 of FIGS. 1A and 1B). In some embodiments, the metadata 135 may be maintained in a volatile memory by the SML 130, and may be periodically stored on the non-volatile memory media 122.

The non-volatile memory media controller 126 may further comprise a read pipeline 241 that is configured to read contextual data from the non-volatile memory media 122 in response to requests received via the bus 125. The requests may comprise a logical address of the requested data, a media address of the requested data, and so on. The read pipeline 241 may be configured to read data stored in a contextual format from the non-volatile memory media 122 and to provide the data to the SML 130 and/or a storage client 116. The read pipeline 241 may be configured to determine the media address of the data using a logical address of the data and the metadata 135. Alternatively, or in addition, the SML 130 may determine the media address of the data and may include the media address in the request. The log storage module 248 may provide the media address to the non-volatile memory elements 123, and the data may stream into the read pipeline 241 via a buffer. The read pipeline 241 may comprise one or more read synchronization buffers for clock domain synchronization, as described above.

The non-volatile memory media controller 126 may further comprise a multiplexer 249 that is configured to selectively route data and/or commands to/from the write pipeline 240 and the read pipeline 241. In some embodiments, non-volatile memory media controller 126 may be configured to read data while filling a buffer of the write pipeline 240 and/or may interleave one or more storage operations on one or more banks of non-volatile memory elements 123 (not shown).

Figure 3:
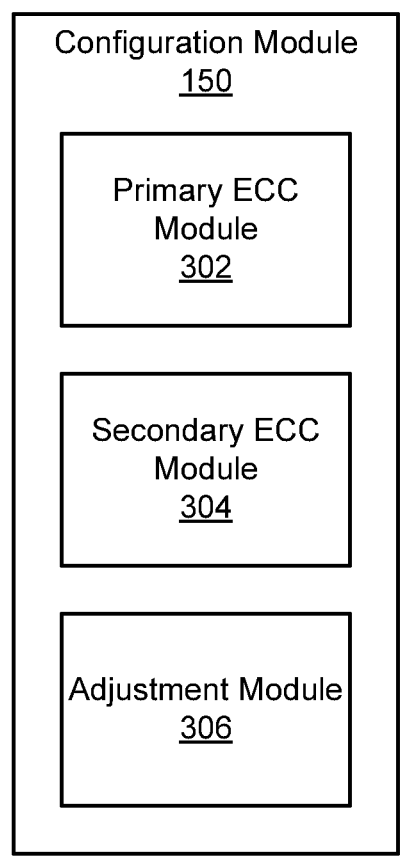
FIG. 3 is a schematic block diagram illustrating one embodiment of a configuration module.

FIG. 3 depicts one embodiment of a configuration module 150. The configuration module 150 may be substantially similar to the configuration module 150 described above with regard to FIGS. 1A, 1B, and 2. In general, as described above, the configuration module 150 adjusts media parameters for non-volatile memory media 122 based on error information for an error correcting code (ECC) chunk with multiple levels or layers of error correcting codes. Adjusting media parameters based on multiple levels of error correcting codes for at least one ECC chunk may allow the non-volatile memory device 120 to store and/or retrieve additional ECC chunks using a weaker error correcting code, with lower overhead or the like.

In the depicted embodiment, the configuration module 150 includes a primary ECC module 302, a secondary ECC module 304, and an adjustment module 306. The primary ECC module 302 and the secondary ECC module 304 may provide different levels of error protection and/or detection and may determine error information for data using one or more of the different levels of error protection. The adjustment module 306 may adjust one or more media parameters for the non-volatile memory media 122, or the like, based at least in part upon error information determined by the primary ECC module 302 and/or the secondary ECC module 304, as described in greater detail below. A level or strength of an error correcting code, as used herein, may comprise a number of bit errors that the error correcting code is capable of detecting and/or correcting, an error rate which the error correcting code is capable of correcting, or the like. A level or strength of an error correcting code may be relative to a number of bits, an overhead or code rate (e.g., a proportion of user data to total data including ECC check bits) for the error correcting code, or the like.

The primary ECC module 302, in one embodiment, is configured to determine whether at least one ECC chunk of a non-volatile memory device 120 is correctable using an error correcting code (e.g., a primary error correcting code, an outer error correcting code, or the like). In some embodiments, the error correcting code for the primary ECC module 302 may be referred to as a "primary," "first," or "outer" error correcting code, to distinguish it from other error correcting codes that may be used by other modules, such as the secondary ECC module 304. In various embodiments, a means for determining whether at least one ECC chunk of a non-volatile memory device 120 is correctable using a primary or first error correcting code may include a primary ECC module 302, a configuration module 150, a non-volatile memory controller 124, a non-volatile memory media controller 126, a device driver such as an SML 130, a processor 111, a read pipeline 241, other logic hardware and/or other executable code stored on a computer readable storage medium. Other embodiments may include similar or equivalent means for determining if the ECC chunk is correctable using a primary or first error correcting code. In a further embodiment, the primary ECC module 302 may be configured to determine primary or first error information using a primary error correcting code to attempt to decode the at least one ECC chunk.

In one embodiment, an ECC chunk may refer to a code word for the primary error correcting code. In various embodiments, the primary error correcting code may be one of various types of error correcting code, such as a block code, a convolutional code, a Bose-Chaudhuri-Hocquenghem (BCH) code, a low-density parity check (LDPC) code, a Hamming code, a Reed-Solomon code, a turbo code, or the like. In a certain embodiment, the primary error correcting code may be a systematic error correcting code, so that each ECC chunk, or code word, may store data received by an encoder for the primary error correcting code, as well as parity bits, or check bits. A systematic error correcting code, as used herein, may comprise an error correcting code that includes or combines the input data in the output ECC code word or chunk, so that the ECC code word or chunk includes the input data directly. This means that the input data (e.g. the message) is readily identifiable in the ECC code word. In other words, the input data (e.g. the message) is either not transformed/encoded or is encoded/transformed with a unity encoding. A non-systematic code, as used herein, may comprise an error correcting code that encodes or transforms the input data so that the encoded output includes the input data encoded together with other ECC check bits (aka parity bits). This means that the input data (e.g. the message) is not readily identifiable in the ECC code word. An ECC chunk generated by a systematic error correcting code may store ECC check bits or parity bits before the non-encoded input data, after the non-encoded input data, or at one or more other locations within the non-encoded input data. An ECC chunk generated by a non-systematic error correcting code may provide error detection and/or correction using the data encoding itself, with or without separate ECC check bits. In a non-systematic error correcting code, the output may comprise a code word which itself may be considered the ECC check bits.

The primary ECC module 302 and the secondary ECC module 304, in certain embodiments, may encode, decode, or otherwise provide error correction and/or detection to different data, different ECC chunks, or the like, so that the different data has different levels or strengths of error protection. For example, the secondary ECC module 304 may provide a stronger error correcting code for one or more ECC chunks than an error correcting code provided by the primary ECC module 302 for the rest of the ECC chunks, as described below. As used herein, one error correcting code is stronger than another error correcting code if the error correcting code is capable of detecting and/or correcting more bit errors per unit of data, detecting and/or correcting data with a higher error rate, or the like. The primary ECC module 302 may provide a lower level of error correction than the secondary ECC module 304 for a majority of data of the non-volatile memory device 120 and the secondary ECC module 304 may provide a higher or stronger level of error correction for a minority of data of the non-volatile memory device 120, such as a predefined type or class of data (e.g., priority data, access data, or the like), as described below.

The primary ECC module 302 and the secondary ECC module 304, in a further embodiment, may encode, decode, or otherwise provide error correction and/or detection on at least a portion of the same data, for one or more ECC chunks or the like. For example, the primary ECC module 302 may provide a standard, uniform, or other predetermined level of error correction to all or substantially all data of the non-volatile memory device 120, including one or more segments or portions of data for which the secondary ECC module 304 has already provided error correction. In such embodiments, the primary ECC module 302 may provide a primary, outer layer of error correction around a secondary, inner layer of error correction provided by the secondary ECC module 304 and nested within an ECC chunk of the primary ECC module 302 as described below. As used herein, an inner error correcting code comprises an error correcting code for an ECC chunk embedded or nested within another ECC chunk generated by another, outer error correcting code.

In some embodiments, in order to nest multiple layers of error correction, the input data bits for an ECC chunk of the primary ECC module 302 may comprise a secondary ECC chunk generated by the secondary ECC module 304. In this manner, for a systematic ECC code word provided by the primary ECC module 302, the message or input data (e.g., the data other than the check bits for the error correcting code) may comprise one or more secondary or inner ECC code words from the secondary ECC module 304. Thus, in certain embodiments, a configuration module 150 using a systematic code as a primary, outer error correcting code may decode an ECC chunk using a secondary, inner error correcting code even if the primary ECC module 302 determines that the ECC chunk is uncorrectable using the primary, outer error correcting code. In this manner, in one embodiment, the secondary ECC module 304 may provide stronger, higher overhead error protection for at least a subset of ECC chunks of the non-volatile memory device 120, such as the access data described below, enabling the primary ECC module 304 to provide less strong, lower overhead error protection for the rest of the ECC chunks without the added overhead of the stronger protection.

In one embodiment, the primary ECC module 302 may be configured to determine error information using the primary error correcting code to attempt to decode at least one ECC chunk. As used herein, error information comprises data associated with one or more errors or potential errors for one or more ECC chunks. The primary ECC module 302 may determine error information for an ECC chunk by processing the ECC chunk using an ECC decoder or the like. In attempting to decode at least one ECC chunk, the primary ECC module 302 may determine error information either from successfully decoding the at least one ECC chunk, or may determine error information from an unsuccessful attempt to decode the ECC chunk. In various embodiments, error information may include whether or not an ECC chunk is correctable, a number and/or location of bits in error, a raw bit error rate (RBER), an uncorrectable bit error rate (UBER), a ratio of bits which store a binary zero to bits which store a binary one in the decoded data (e.g., a DC balance as described below), or other information related to decoding (or attempting to decode) the at least one ECC chunk using one or more levels of error correcting codes.

In some embodiments, the non-volatile memory device 120 may be in communication with a host device, such as a computing device 110, over a communications bus, such as the bus 125. In one embodiment, a region of the non-volatile memory media 122 such as a physical or logical page, physical or logical erase block, chip, die, die planes, plurality of chips or dies, or the like, may include multiple ECC chunks. In a further embodiment, each ECC chunk may include or encode data from a user, metadata, a predetermined pattern, or the like. In some embodiments, one or more ECC chunks for a region may encode access data facilitating access to the region, while other ECC chunks may encode other data, such as user data (e.g., workload data stored for a client 116) or the like.

Access data, as used herein, comprises metadata, settings, and/or thresholds which the non-volatile memory controller 124, the non-volatile memory media controller 126, a device driver such as the SML 130, or the like may use to access (e.g., read, write, program, and/or erase) a region of the non-volatile memory media 122. Access data may include one or more media parameters or storage thresholds as described below (e.g., read voltage thresholds, a bias for multiple read voltage thresholds, a resistivity threshold, a programming threshold, an erase threshold, a hardware driver level threshold, a storage controller level threshold, or the like), a program/erase cycle count for the region of non-volatile memory media 122, an age of the non-volatile memory media 122 (e.g., time since first powered on, amount of time powered on, or the like), a table with multiple media parameters or storage thresholds, a logical-to-physical mapping for data of a region of non-volatile memory media 122, validity metadata or a validity bitmap for data of a region of non-volatile memory media 122, or other information associated with accessing data of a region of non-volatile memory media 122.

Access data may be stored in one or more predefined locations in a storage region of the non-volatile memory device 120. For example, the first ECC chunk, the first two ECC chunks, the first N ECC chunks, the Nth one or more ECC chunks, or the like. In certain embodiments, each storage region may comprise access data. In certain embodiments, the access data for a storage region may comprise a media access control (MAC) header or erase block opener for a storage region. In one embodiment, an ECC chunk encoding access data may be protected by a stronger error correcting code than user data or workload data, multiple levels or layers of error correcting codes, or the like to ensure that the access data may be decoded and errors corrected. The adjustment module 306 may use access data for a region, decoded by the primary ECC module 302 and/or the secondary ECC module 304, to read from, write/program, and/or otherwise access other data of the region (e.g., user data, workload data, client data), as described below).

In various embodiments, the configuration module 150 may decode (or attempt to decode) the access data using the stronger error correcting code, the multiple error correcting codes, or the like thereby deriving error information that the configuration module 150 may use to determine or adjust media parameters for other data of the region of non-volatile media 122, even if the other data is protected by one or more weaker error correcting codes, fewer error correcting codes, or the like. In a further embodiment, ECC chunks that do not encode access data may encode additional data (e.g., user data, workload data) using a single level of error correcting code, such as the primary or outer error correcting code used by the primary ECC module 302. ECC chunks encoding data and access data are described in further detail below with regard to FIG. 5A, FIG. 5B, and FIG. 5C.

In one embodiment, the primary ECC module 302 may include, control, or otherwise cooperate with a decoder for the primary error correcting code. In a certain embodiment, the primary ECC module 302 may use the decoder for the primary error correcting code with at least one ECC chunk encoding access data to determine error information, to determine whether the at least one ECC chunk is decodable using the primary error correcting code, or the like. In a further embodiment, the primary ECC module 302 may use the decoder for the primary error correcting code with additional ECC chunks to decode data requested by a user or the like (e.g., the primary ECC module 302 may encode and/or decode all or substantially all data for the non-volatile memory device 120 and the secondary ECC module 304 may encode and/or decode a subset of data, such as access data).

In other embodiments, the primary ECC module 302 may encode and/or decode a first set of data (e.g., user data, workload data, client data) and the secondary ECC module 304 may encode and/or decode a secondary, different set of data (e.g., access data) with one or more additional error correcting codes (e.g., a stronger error correcting code, a replication code, or the like as described below). In some embodiments, the primary ECC module 302 may include, control, or otherwise cooperate with an encoder for the primary error correcting code, which encodes access data and/or other data so it can be written to the non-volatile memory media 122. In a certain embodiment, the write pipeline 240 may include the encoder for the primary error correcting code, and the read pipeline 241 may include the decoder for the primary error correcting code.

The secondary ECC module 304, in one embodiment, is configured to determine whether at least one ECC chunk encoded with a secondary error correcting code is correctable using the secondary error correcting code. In certain embodiments, the secondary error correcting code may be different from the primary error correcting code described above with regard to the primary ECC module 302. As described above, the primary ECC module 302 and the secondary ECC module 302 may operate on different data (e.g., the primary ECC module 302 may encode and/or decode user data, workload data, client data or the like and the secondary ECC module 304 may encode and/or decode access data), or, in certain embodiments, the primary ECC module 302 and the secondary ECC module 304 may operate on at least a portion of the same data in a nested manner (e.g., the primary ECC module 302 may encode and/or decode each ECC chunk and the secondary ECC module 304 may encode and/or decode a subset of ECC chunks, such as access data, using multiple levels or layers of error correcting codes).

In some embodiments, the secondary ECC module 304 may be configured to determine or obtain error information by decoding (or attempting to decode) the at least one ECC chunk using a secondary error correcting code, a secondary and tertiary/third error correcting code, or the like. In certain embodiments, the secondary ECC module 304 may determine or obtain error information, including determining whether the at least one ECC chunk is correctable using the secondary error correcting code, in response to the primary ECC module 302 determining that the at least one ECC chunk is uncorrectable using the primary error correcting code.

In various embodiments, a means for obtaining error information by decoding the at least one ECC chunk using a secondary error correcting code may include a secondary ECC module 304, a configuration module 150, a non-volatile memory controller 124, a non-volatile memory media controller 126, a device driver such as an SML 130, a processor 111, a read pipeline 241, other logic hardware and/or other executable code stored on a computer readable storage medium. Other embodiments may include similar or equivalent means for obtaining error information using the secondary error correcting code.

In one embodiment, the secondary ECC module 304 may include, control, or otherwise cooperate with a decoder for the secondary error correcting code, a third error correcting code, and/or one or more additional error correcting codes. In some embodiments, the secondary ECC module 304 may additionally include, control, or otherwise cooperate with an encoder for the secondary error correcting code, a tertiary/third error correcting code, and/or one or more additional error correcting codes. An encoder of the secondary ECC module 304 may encode data of the at least one ECC chunk using the secondary error correcting code (e.g., an inner error correcting code, a replication error correcting code, or the like). The primary ECC module 302, in certain embodiments, may provide an ECC chunk protected or encoded using the secondary error correcting code as in inner error correcting code to the primary ECC module 302, for nesting or embedding within another ECC chunk encoded using the primary, or outer, error correcting code as described above. In other embodiments, encoders and/or decoders of the primary ECC module 302 and the secondary ECC module 304 may operate on different data, without nesting or embedding multiple levels or layers of error correcting codes in the same ECC chunks or code words.

As described above, error information may comprise data associated with one or more errors or potential errors for one or more ECC chunks. In various embodiments, error information that the secondary ECC module 304 determines may include information related to decoding, and/or attempting to decode, the at least one ECC chunk using one or more levels of error correcting codes. Thus, in one embodiment, the error information may include information from a decoder of the secondary ECC module 304 for the secondary error correcting code. In another embodiment, the error information may include primary error information determined by the primary ECC module 302 using the primary error correcting code, secondary error information determined by the secondary ECC module 304 using the secondary error correcting code, and/or additional error information related to one or more additional error correcting codes. In a further embodiment, the error information may include "outer" error information determined by using the primary error correcting code to attempt to decode the at least one ECC chunk, and "inner" error information determined by using the secondary error correcting code to attempt to decode the at least one ECC chunk. As described above with regard to the primary ECC module 302, error information may include an indication of whether or not an ECC chunk is correctable using one or more of the error correcting codes, the number and/or location of bits in error, a raw bit error rate (RBER), an uncorrectable bit error rate (UBER), a ratio of bits which store a binary zero to bits which store a binary one in the decoded data (e.g., a DC balance as described below), or other information related to decoding (or attempting to decode) the at least one ECC chunk using one or more levels of error correcting codes.

In various embodiments, the secondary error correcting code may comprise one of various types of error correcting codes, such as a block code, a convolutional code, a Bose-Chaudhuri-Hocquenghem (BCH) code, a low-density parity check (LDPC) code, a Hamming code, a turbo code, a Reed-Solomon code, a Walsh-Hadamard code, a Hadamard code, another code from the Reed-Muller family, or the like. In a certain embodiment, the secondary error correcting code may include a repetition error correcting code or replication error correcting code. As described below, a replication or repetition error correcting code may repeat a message multiple times to increase the probability that a majority of the repeated messages will be correct. In one embodiment, the secondary error correcting code may be a systematic code, so that each code word for the secondary error correcting code stores data received by an encoder for the secondary error correcting code, as well as parity bits, or check bits. In another embodiment, the secondary error correcting code may be a non-systematic code, so that the data as originally received by an encoder for the secondary error correcting code may not appear in the code word.

In some embodiments, the secondary ECC module 304 may encode or otherwise provide error correction for access data, using at least a secondary error correcting code. Thus, in further embodiments, the secondary ECC module 304 may determine whether the ECC chunk is correctable using the secondary error correcting code by attempting to decode the access data. In certain embodiments, as described above, the primary ECC module 302 may encode data other than the access data using additional ECC chunks using the primary error correcting code without the secondary error correcting code, and the secondary ECC module 304 may not operate to encode and/or decode the additional ECC chunks. Thus, in some embodiments, the non-volatile memory device 120 may use two error correcting codes to store the access data with a high degree of reliability, but may use one error correcting code to store other data for easy retrieval, with reduced overhead, or the like. ECC chunks encoding data and access data are described in further detail below with regard to FIG. 5A, FIG. 5B, and FIG. 5C.

As an example, in one embodiment, the primary error correcting code used by the primary ECC module 302, which may comprise an outer error correcting code, may include a BCH code capable of decoding data with a RBER of about 1.3e-3 or the like. In a further embodiment, the secondary error correcting code used by the secondary ECC module 304, which may comprise an inner error correcting code, may include a BCH code capable of decoding data with a RBER of about 0.1, or another RBER that is greater than that correctable by the primary error correcting code. In some embodiments, the non-volatile storage device 120 may use the primary and/or outer error correcting code to provide error correction with low computational and storage overhead for data other than the access data. In further embodiments, the configuration module 150 may use both the primary and/or outer error correcting code and the stronger secondary and/or inner error correcting code with the access data, to increase the likelihood of successfully adjusting media parameters for the non-volatile memory media 122 based on the resulting error information, based on the access data, or the like. Using a configuration module 150 to tune or adjust media parameters based on error information, based on access data protected by a stronger error correcting code, or the like may, in some embodiments, keep the RBER low enough for the primary/outer error correcting code to be weaker than it could otherwise be without raising the UBER, thereby using keeping the overhead for the primary/outer error correcting code low.

The adjustment module 306, in one embodiment, is configured to determine, adjust, or set one or more media parameters for accessing non-volatile memory media 122. In one embodiment, the adjustment module 306 may determine one or more media parameters based on access data successfully decoded by the primary ECC module 302 and/or the secondary ECC module 304. In a further embodiment, the adjustment module 306 may determine one or more media parameters based on error information determined by the primary ECC module 302 and/or the secondary ECC module 304 through decoding or attempting to decode one or more ECC chunks. In one embodiment, the adjustment module 306 may adjust one or more media parameters in response to the secondary ECC module 304 determining that at least one ECC chunk is correctable using the secondary error correcting code. In various embodiments, a means for adjusting one or more media parameters may include an adjustment module 306, a configuration module 150, a non-volatile memory controller 124, a non-volatile memory media controller 126, a write pipeline 240, a read pipeline 241, other logic hardware and/or other executable code stored on a computer readable storage medium. Other embodiments may include similar or equivalent means for adjusting media parameters.

In certain embodiments, a media parameter may be a parameter related to or associated with writing, storing, programming, reading, or erasing data using non-volatile memory media 122. Media parameters may relate to writing to, or programming, storage cells of the non-volatile memory media 122, reading from storage cells, erasing storage cells, managing storage cells, device driver or storage controller settings for storage cells, or the like. A media parameter for a set of storage cells may be associated with a device driver such as an SML 130 for the non-volatile memory device 120, with a non-volatile memory controller 124, or the like, and may relate to how the device driver and/or non-volatile memory controller 124 use, manage, and interact with the set of storage cells and/or the non-volatile memory media 122.

In various embodiments, a media parameter may include one or more storage thresholds, such as one or more read voltage thresholds, a bias for multiple read voltage thresholds, a resistivity threshold, a programming threshold, an erase threshold, a hardware driver level threshold, a storage controller level threshold, or the like. A read voltage threshold is a voltage level that separates discrete values stored in storage cells of the non-volatile memory media 122. Different non-volatile memory technologies may use different thresholds other than voltages to distinguish between discrete states. Phase change RAM or PRAM, for example, stores data in chalcogenide glass that has different electrical resistivity in different states. For PRAM, the adjustment module 306 may determine, set, and/or adjust resistivity thresholds that distinguish between discrete storage states. In light of this disclosure, various media parameters are clear that the adjustment module 306 may adjust. Further embodiments of adjusting media parameters are described with reference to the "configuration parameters" of U.S. patent application Ser. No. 13/719,045 entitled "Managing Non-Volatile Media" and filed Dec. 18, 2012 for Robert Wood et al., which is incorporated herein by reference in its entirety.

In one embodiment, the adjustment module 306 may adjust individual media parameters separately. In another embodiment, the adjustment module 306 may adjust multiple media parameters together. For example, in a certain embodiment, the non-volatile memory media 122 may include storage cells which encode multiple bits per cell using multiple states per cell, separated by read voltage thresholds. In a further embodiment, multi-level cell (MLC) Flash memory may store two bits per cell by using four states per cell, separated by three read voltage thresholds. An error may occur if a voltage level for the cell drifts from one state past a read voltage threshold into an adjacent state. Such errors may occur due to read disturbs, program disturbs, stress-induced leakage current, or other phenomena that may affect the stored charge, or voltage level, of a Flash memory cell. If the error information suggests drifting voltage levels, the adjustment module 306 may compensate by adjusting individual read voltage thresholds, or by adjusting the three read voltage thresholds together, depending on if the amount of voltage drift is similar or different for each state.

In various embodiments, the adjustment module 306 may adjust, set, or otherwise determine one or more media parameters that affect various regions of non-volatile memory media 122. For example, the adjustment module 306 may adjust a media parameter for a physical or logical page, physical or logical erase block, chip, die, plurality of chips or dies, or the like, without affecting other regions of non-volatile memory media 122 for a non-volatile memory device 120. In another embodiment, the adjustment module 306 may adjust a media parameter that affects the non-volatile memory device 120 as a whole.

The adjustment module 306 may adjust a media parameter once during initialization of the non-volatile memory media 122, dynamically with each command issued to the non-volatile memory media 122, or during operation of the non-volatile memory media 122 in response to triggers such as events or time intervals. The non-volatile memory controller 124, in one embodiment, proactively sets one or more media parameters for the non-volatile memory media 122 to improve the utility of the non-volatile memory media 122, to reduce errors, and the like.

In some embodiments, the adjustment module 306 may adjust a media parameter that is modifiable by way of an interface. The interface may comprise a publicly known interface or a proprietary interface and may include use of particular command instructions and/or use of particular parameters, register settings, driver settings, controller settings, a particular set of command instruction sequences, or other differences from regular commands (general purpose commands) or settings used to interface with or manage the set of storage cells for the non-volatile memory media 122.

In one embodiment, the adjustment module 306 may adjust one or more media parameters based on the total available error information. In another embodiment, the adjustment module 306 may adjust one or more media parameters based on a portion of the available error information, but may ignore other error information. Adjusting media parameters based on error information may allow the non-volatile memory device 120 to read or re-read data with a reduced RBER or UBER. For example, in one embodiment, a page of data encoded with the primary or outer error correcting code may contain ECC chunks with uncorrectable errors if the non-volatile memory device 120 reads the page using default read voltage thresholds. In a further embodiment, however, the adjustment module 306 may adjust or set the read voltage thresholds for the page based on error information from decoding access data stored on the page using multiple levels of error correcting codes, a stronger error correcting code, or the like. The adjustment module 306 may retrieve one or more media parameters from the access data, may determine one or more media parameters based on error information, or the like. If the non-volatile memory device 120 reads the page using the adjusted read voltage thresholds, the same page of data may contain fewer errors, so that more of the ECC chunks are correctable using the primary or outer error correcting code.

Figure 4:
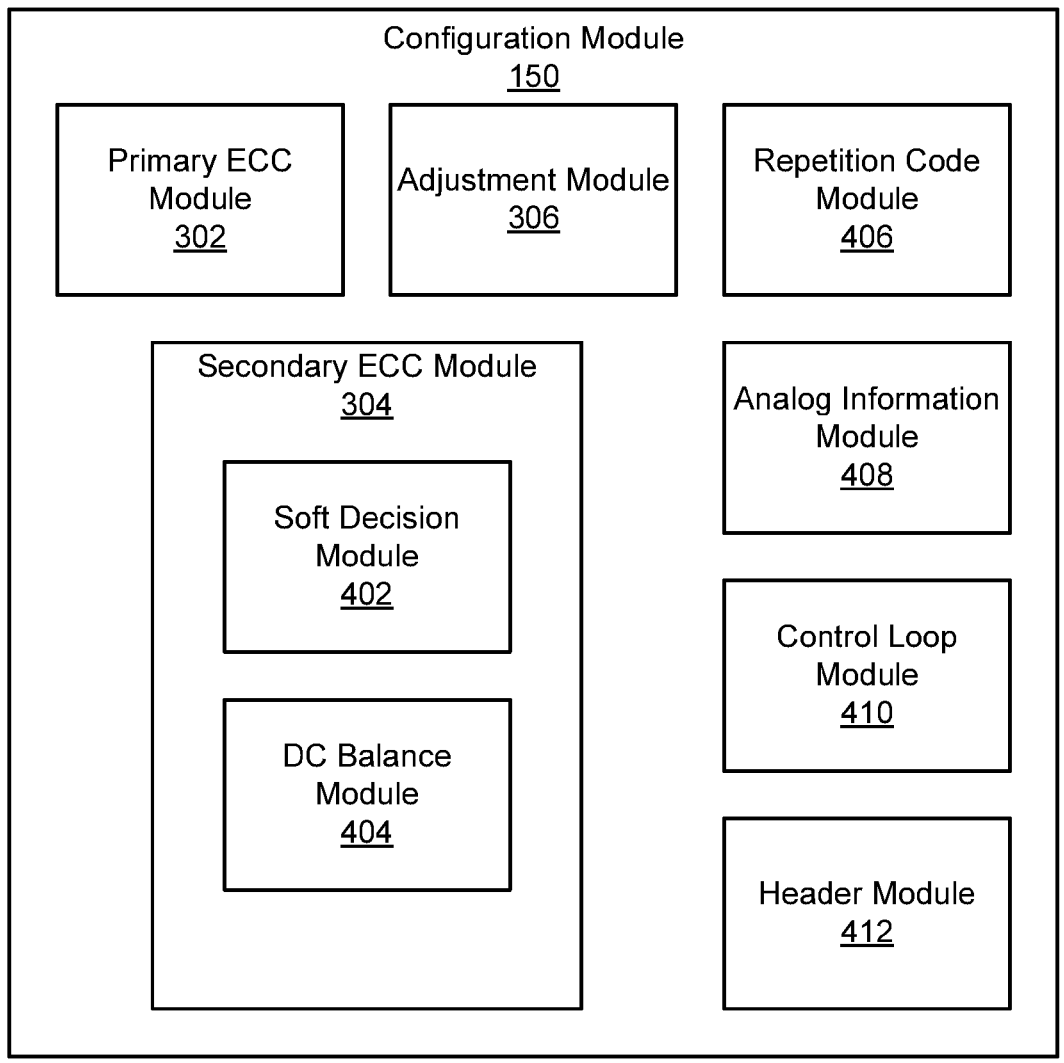
FIG. 4 is a schematic block diagram illustrating another embodiment of a configuration module.

FIG. 4 depicts another embodiment of a configuration module 150. The configuration module 150, in certain embodiments, may be substantially similar to the configuration module 150 described above with regard to FIG. 1A, FIG. 1B, FIG. 2, and/or FIG. 3. In the depicted embodiment, the configuration module 150 includes a first ECC module 302, a secondary ECC module 304, and an adjustment module 306, which may be configured substantially as described above with regard to FIG. 3. The configuration module 150, in the depicted embodiment, includes a repetition code module 406, an analog information module 408, a control loop module 410, and a header module 412. The secondary ECC module 304, in the depicted embodiment, includes a soft decision module 402 and a DC balance module 404.

The repetition code module 406, in one embodiment, is configured to determine whether the at least one ECC chunk encoded with multiple error correcting codes is correctable using a repetition error correcting code. In various embodiments, a means for determining whether the at least one ECC chunk is correctable using a repetition error correcting code may include a repetition code module 406, a configuration module 150, a non-volatile memory controller 124, a non-volatile memory media controller 126, a device driver such as an SML 130, a processor 111, a read pipeline 241, other logic hardware and/or other executable code stored on a computer readable storage medium. Other embodiments may include similar or equivalent means for determining if the ECC chunk is correctable using a repetition error correcting code.

The at least one ECC chunk may include or encode access data encoded with the primary/outer, secondary/inner, and/or repetition error codes, so that error information used by the adjustment module 306 may be based on any of the multiple layers of error correcting codes. In one embodiment, the primary ECC module 302 may be configured to determine primary, or outer error information for the at least one ECC chunk, and the secondary ECC module 304 may be configured to determine secondary, or inner error information for the at least one ECC chunk. Similarly, in a further embodiment, the repetition code module 406 may be configured to determine third, or "repetition" error information by using the repetition error correcting code to attempt to decode the at least one ECC chunk. Then, the error information used by the adjustment module 306 may include the first/primary, second/secondary, and/or third/repetition error information.

A replication or repetition error correcting code, as used herein, may repeat a message (e.g., the input or payload data for an ECC chunk) multiple times to increase the probability that a majority of the repeated messages will be correct. An ECC chunk, which may include a code word for the primary/outer error correcting code or the like, may encode multiple repeated messages (e.g., the input or payload data for the ECC chunk) for the repetition error correcting code. In a further embodiment, the repetition code module 406 may repeat an entire ECC chunk, including a message and ECC check bits for the message, an encoded message, or the like, multiple times. The repetition code module 406, in certain embodiments, may store different copies of a message, an ECC code word, or the like in different storage regions, different subregions, different memory elements, or the like, to decrease a probability that different copies will be effected by the same errors. For example, the repetition code module 406 may repeat a message, an ECC code word, or the like on each of a plurality of memory elements of the non-volatile memory media 122, across an array of memory elements or the like, with each memory element storing one copy of the repeated message or ECC code word. As described above, a memory element may comprise a chip, a package, a die plane, a die, a logical or physical erase block, a logical or physical page, or the like.

In one embodiment, the repetition code module 406 may determine whether the ECC chunk is correctable using the repetition error correcting code based on the number of identical instances of the repeated message. In another embodiment, the repeated message may be a code word for the secondary/inner error correcting code, and the repetition code module 406 may determine whether the ECC chunk is correctable using the repetition error correcting code based on how many repeated messages are correctable using the secondary/inner error correcting code. In various embodiments, the repetition code module 406 may determine that the ECC chunk is correctable using the repetition error correcting code based on a number of repeated messages satisfying a threshold number for messages having a certain property such as being identical, being decodable with a secondary/inner error correcting code, or the like.

In one embodiment, the repetition code module 406 may include, control, or otherwise cooperate with a decoder for the repetition error correcting code. In a further embodiment, the repetition code module 406 may include, control, or otherwise cooperate with an encoder for the repetition error correcting code.

The at least one ECC chunk, in one embodiment, may include or encode access data using the repetition error correcting code and/or the secondary/inner error correcting code with the primary/outer error correcting code to provide multiple levels of error correction for the access data. In a further embodiment, additional ECC chunks may include or encode additional data using one level of error correcting code (e.g., the primary/outer error correcting code). ECC chunks encoding data and access data are described in further detail below with regard to FIG. 5A, FIG. 5B, and FIG. 5C.

In one embodiment, the repetition error correcting code may be the secondary/inner error correcting code, and the secondary ECC module 304 may use the repetition code module 406 to decode the repeated messages. For example, in a certain embodiment, each bit of the access data may be repeated as a message for the repetition error correcting code. In another embodiment, the access data as a whole may be repeated as a message for the repetition error correcting code.

In a certain embodiment, the repetition error correcting code may comprise an intermediate code between and/or in addition to the secondary/inner error correcting code provided by the secondary ECC module 304 and the primary/outer error correcting code provided by the primary ECC module 302. For example, the secondary ECC module 304 may provide a code word by encoding access data or other input data using the secondary/inner error correcting code, and the repetition code module 406 may repeat the code word from the secondary ECC module 304 as a message for the repetition error correcting code. The primary ECC module 302 may encode the repeated messages, taken together, using the primary/outer error correcting code to form at least one ECC code word or chunk.

The analog information module 408, in one embodiment, is configured to derive analog information from repeated messages of the repetition error correcting code. In a further embodiment, the analog information module 408 may derive analog information from the repeated messages in response to the repetition code module 406 determining that the at least one ECC chunk is uncorrectable using the repetition error correcting code. In a certain embodiment, the secondary ECC module 304 may be configured to determine that the at least one ECC chunk is correctable, or to decode the at least one ECC chunk, by using the analog information with the secondary, or inner error correcting code. The secondary ECC module 304 may use the analog information to inform a decoder for the secondary/inner error correcting code, and may determine error information based on using the analog information to attempt to decode the at least one ECC chunk with the secondary error correcting code.

In various embodiments, a means for deriving analog information may include an analog information module 408, a configuration module 150, a non-volatile memory controller 124, a non-volatile memory media controller 126, a device driver such as an SML 130, a processor 111, a read pipeline 241, other logic hardware and/or other executable code stored on a computer readable storage medium. Other embodiments may include similar or equivalent means for deriving analog information.

As used herein, analog information for data comprises state information for the data in addition to a binary value for the data. For example, instead of or in addition to a binary one or a binary zero for a bit of data in an ECC chunk, analog information may comprise a read voltage level for a storage cell for the bit, thereby comprising additional state information beyond a determined binary value. While referred to herein as "analog" information, because of the greater precision possible than may be indicated by a binary one or a binary zero, in certain embodiments, analog information is represented as a binary value, such as representing a read voltage level with a multiple bit accuracy instead of as a single binary one or zero. Thus analog information may be represented as a digital value. In one embodiment, analog information may include a range of values (e.g., multiple bits) for a single bit instead of a "hard" determination that the bit is a zero or a one. In a certain embodiment, the analog information module 408 may derive analog information from repeated messages by summing each repeated bit. In another embodiment, the analog information module 408 may derive analog information from repeated messages by averaging each repeated bit. In a further embodiment, the average of each repeated bit may be weighted based on a historical reliability for that bit. In light of this disclosure, many useful forms of analog information are clear.

In one embodiment, if the repetition code module 406 determines that the ECC chunk is not decodable using the repetition error correcting code, the analog information module 408 may derive analog information from the repeated bits. The secondary ECC module 304 may then use the analog information to inform a soft-decision decoder for the secondary error correcting code, such as the soft decision module 402. Soft-decision decoders are described further below with regard to the soft decision module 402.

The control loop module 410, in one embodiment, is configured to iteratively read the at least one ECC chunk encoded with multiple error correcting codes from the non-volatile memory device 120 using the adjusted media parameters. In each iteration, the control loop module 410 may activate the secondary ECC module 304 to determine the error information, and may activate the adjustment module 306 to adjust one or more media parameters. The iterations of the control loop module 410 may continue until an error criterion is satisfied.

In various embodiments, an error criterion for ending iterations of the control loop module 410 may be any criterion defining an acceptable type or quantity of errors. For example, in one embodiment, the control loop module 410 may determine that the error criterion is satisfied if an ECC chunk is decodable using the primary, or outer error correcting code. In another embodiment, the control loop module 410 may determine that the error criterion is satisfied if the RBER for a region of the non-volatile memory media is below a previously determined threshold. In light of this disclosure, many error criteria are clear which may be suitable for ending iterations of the control loop module 410.

Iteratively adjusting media parameters using a control loop module 410 may allow the configuration module 150 to tune media parameters for the non-volatile memory media 122 more effectively than it could by using the adjustment module 306 once. For example, in one embodiment, the error information may suggest a direction, but not a distance, for adjusting a read voltage threshold. Thus, the read voltage threshold may be over-adjusted or under-adjusted if the adjustment module 306 adjusts it once. However, a control loop module 410 may repeatedly determine error information and activate the adjustment module 306 to make successively finer adjustments to the read voltage threshold in order to satisfy an error criterion.

The header module 412, in one embodiment, is configured to use data of the at least one ECC chunk encoded with multiple error correcting codes as a header for one or more additional ECC chunks of the non-volatile memory device 120. In various embodiments, the data of the at least one ECC chunk may include various types of data such as a header, user data, metadata, a predetermined data pattern, or the like.

In some embodiments, a header contains information about the additional ECC chunks, or about the data stored on the additional ECC chunks. For example, in some embodiments, a header may include bit maps for retired regions of non-volatile memory media 122, a program count or erase count, a version number, a seed for a pseudorandom number generator used in connection with the data, or the like.

In one embodiment, the decoder for the secondary, inner error correcting code may include a soft-decision decoder. For example, in a certain embodiment, the secondary ECC module 304 includes a soft decision module 402. The soft decision module 402, in a further embodiment, is configured to decode the at least one ECC chunk encoded with multiple error correcting codes using a soft-decision decoder with the secondary, inner error correcting code. In some embodiments, a soft-decision decoder may decode a code word for the secondary/inner error correcting code using "soft information" that includes more than one bit of information for each bit of the code word. For example, in one embodiment, the soft decision module 402 may use an analog or multiple-bit value as soft information to indicate a reliability for each bit of the code word. By using soft information, the soft decision module 402 may, in some embodiments, be able to decode an ECC chunk that would be otherwise uncorrectable using the secondary/inner error correcting code.

In various embodiments, a soft-decision decoder may be useful for decoding various types of secondary/inner error correcting code, such as an LDPC code, BCH code, turbo code, or the like. In one embodiment, the soft decision module 402 may use an iterated soft-decision decoder. In another embodiment, the soft decision module 402 may use a non-iterated soft-decision decoder.

In one embodiment, the soft decision module 402 may use soft information derived from repetitions of a message in a repetition error correcting code. For example, the soft information may include the analog information discussed above with regard to the analog information module 408. In another embodiment, the soft decision module 402 may use soft information derived from repeatedly reading the non-volatile memory media 122 using different read thresholds. For example, reading a MLC Flash memory cell multiple times using different read voltage thresholds may generate soft information about the voltage level of the cell. In light of this disclosure, many types of soft information are clear that the soft decision module 402 may use with a soft-decision decoder.

In one embodiment, the secondary ECC module 304 may use a hard-decision decoder that uses no soft information, in connection with the soft-decision decoder used by the soft decision module 402. In some embodiments, the soft-decision decoder may be able to correct more errors in an ECC chunk than the hard-decision decoder, but the soft-decision decoder may use more time and/or computational resources than the hard-decision decoder. In further embodiments, the secondary ECC module 304 may use the hard-decision decoder to attempt to decode the at least one ECC chunk, and may activate the soft decision module 402 in response to determining that the at least one ECC chunk is uncorrectable using the hard-decision decoder with the secondary/inner error correcting code.

In various embodiments, the soft decision module 402 may be implemented in hardware such as the non-volatile memory media controller 126, in software, such as the SML 130 or a program running on processor 111, or as a combination of hardware and software. For example, in one embodiment, the soft decision module 402 may invoke a hardware soft-decision decoder, but may invoke a more computationally-intensive soft-decision decoder in software if the hardware soft-decision decoder is unable to correct the at least one ECC chunk. Using multiple decoders, including a hard-decision decoder and/or multiple soft-decision decoders for the soft decision module 402, allows the secondary ECC module 304 to decode ECC chunks with fewer errors quickly using a simpler decoder and to decode ECC chunks with more errors using a more complex decoder.

In one embodiment, the secondary ECC module 304 includes a direct current (DC) balance module 404. In a further embodiment, the secondary, inner error correcting code may include a balanced code, and the DC balance module 404 may determine information about a balance or bias of the at least one ECC chunk encoded with multiple error correcting codes. In a certain embodiment, the error information described above may include the information about the balance or bias of the at least one ECC chunk, from the DC balance module 404 or the like.

In various embodiments, a balanced code may be any error correcting code where each code word includes a known ratio or range of ratios of binary zero and binary one bits, such as an equal number of binary zeroes and binary ones or the like. In certain embodiments, the secondary/inner error correcting code may be a balanced code from the Reed-Muller family, such as a Walsh-Hadamard or Hadamard code. In some embodiments, a balanced code may generate a code word many times longer than the encoded data. Thus, using a balanced code for the secondary/inner error correcting code may result in encoding a small number of bits very reliably, increasing the likelihood of the secondary ECC module 304 obtaining useful error information by successfully decoding the at least one ECC chunk with the secondary/inner error correcting code.

In some embodiments, information about the "DC balance," "balance," or "bias" of an ECC chunk, or code word may refer to any information reflecting how similar the code word is to a known "balanced" or "biased" code word with a known or expected ratio of binary zeroes and binary ones, such as an equal number of ones and zeros. Information about the balance may include any information reflecting the relative quantities or frequencies of zero and one bits in the code word. For example, in one embodiment, information about the balance of a code word may include the mean value of bits in the code word, so that a mean value of 0.5 indicates that the code word is balanced with an equal number of binary ones and binary zeroes. In another embodiment, information about the balance of a code word may include a ratio of the number of ones to the number of zeros in the code word, so that a ratio of 1 indicates that the code word is balanced. In certain embodiments, a measurement of the "whiteness" of the code word, or its similarity to random noise, may also provide information about the balance of the code word.

In some embodiments, using a balanced code as the secondary/inner error correcting code results in a balanced ECC chunk. In certain embodiments, however, the DC balance module 404 may determine that a read ECC chunk encoded has become unbalanced, or does not exhibit an expected ratio of binary ones and binary zeroes, due to errors or the like. In one embodiment, the adjustment module 306 may adjust one or more media parameters based on error information from the DC balance module 404, to restore the balance of the at least one ECC chunk.

The difference between the read ratio of binary ones and binary zeroes of an ECC chunk and the expected or known ratio may provide the adjustment module 306 a direction or drift For example, read or write disturb errors may cause a read ECC chunk to exhibit a greater number of binary ones than expected (e.g., a balance shift to the right) while retention errors may cause a read ECC chunk to exhibit a greater number of binary zeroes than expected (e.g., a balance shift to the left). Adjusting media parameters to restore the balance of the ECC chunk may, in a further embodiment, reduce the number of errors in additional ECC chunks storing additional data, if the at least one ECC chunk and the additional ECC chunk are susceptible to the same types of errors.

In one embodiment, the DC balance module 404 determines a direction of deviation for a read data set, such as an ECC code word or chunk, a page, a range of logical blocks or segments, or the like. The direction of deviation, in one embodiment, is a difference between the read balance or bias of the data set and a known or expected balance or bias. The direction or difference may be represented as a value, a sign (e.g., positive or negative), a relationship (e.g., greater than, less than), a direction (e.g., up, down), or the like. The DC balance module 404, in certain embodiments, may determine a direction of deviation based on an encoding type used for storage cells of the non-volatile memory media 122, based on a physical and/or electrical architecture of the storage cells of the non-volatile memory media 122, or the like. For example, the DC balance module 404 may examine the balance or bias deviation in the data set to determine a direction of deviation based on a media type (2-bit MLC, 3-bit MLC, n-bit-MLC), which page of a multi-phase programming model was read, an encoding type for the non-volatile memory media 122 (such as a Gray code encoding type, a binary code encoding type, or the like), and/or a magnitude of the determined deviation.

The DC balance module 404, in one embodiment, may determine the direction by subtracting a ratio, proportion, or other representation of the known or expected balance/bias from a representation of the read balance/bias of the data set. For example, in one embodiment, the DC balance module 404 may subtract the proportion of binary ones, zeroes, multi-bit binary symbols, or the like that are expected based on the known balance/bias from the proportion of binary ones, zeroes, multi-bit binary symbols, or the like that are in the read data set. Depending on whether ratios of binary ones are compared or ratios of binary zeroes are compared and whether a high voltage represents a binary one or a binary zero, or other specific architectures of the storage cells, the DC balance module 404 may invert the difference or perform another transform to determine the direction.

In embodiments where an error bias from the primary ECC module 302 and/or the secondary ECC module 304 is available, the DC balance module 404 may determine the direction of deviation based on one or more bits of the data set that are in error, as indicated by the error bias. An error bias, as used herein, is error information comprising a representation of one or more detected bit errors in a data set. In one embodiment, an error bias includes a location or position of a detected bit error in a data set. In another embodiment, an error bias includes a value for a detected bit error. A value for a detected error may include an error corrected value of a bit in error, an error value of the bit in error, or the like. For example, in one embodiment, primary ECC module 302 and/or the secondary ECC module 304 may provide the DC balance module 404 with an uncorrected data set and an error bias indicating locations of detected bit errors and the DC balance module 404 may determine a deviation from the known balance/bias by inverting or flipping the bits in those locations. In another embodiment, for example, the primary ECC module 302 and/or the secondary ECC module 304 may provide the DC balance module 404 with an error corrected data set and an error bias indicating locations of detected bit errors and the DC balance module 404 may determine a read balance/bias by inverting or flipping the bits in those locations.

In one embodiment, for NAND flash media 122 or the like, a binary zero may be represented by a voltage below a read voltage threshold and a binary one may be represented by a voltage above the read voltage threshold. In one example, a data set may be stored with a known bias of 0.5, representing that the expected balance/bias of the data set should be one half binary ones, or DC balanced. In this example, the data set may be read from the storage cells and may gave a read balance/bias of 0.7, meaning that seventy percent of the data bits are binary ones. To determine the direction of deviation, in one embodiment, the DC balance module 404 subtracts the expected bias, 0.5, from the read bias of the data set, 0.7, for a direction of 0.2. The direction may be the entire result (e.g., "0.2"), the sign of the result (e.g., "positive"), a relationship (e.g., "greater than"), a direction, (e.g., "up"), or another indicator that represents the difference between the expected bias of 0.5 and the read bias of 0.7.

In another example, if the read balance/bias of a data set is 0.3, meaning that thirty percent of the data bits are binary ones, the DC balance module 404, in one embodiment, may subtract an expected bias of 0.5 or the like from the read bias of the data set, 0.3, for a difference of −0.2. In this example, the direction is the opposite of the first example, "−0.2," "negative," "less then," "down," or the like.

Because, in certain embodiments, the expected balance/bias is known, comparing a read balance/bias relative to the known balance/bias indicates that certain bits which should have satisfied the known balance/bias presently do not, which may be due to a data error or due to changes in the voltage level stored in the storage cells after they were written. In addition, determining that the difference is positive or negative indicates whether the read voltage should be increased or decreased such that a re-read of the data set will result in a read balance/bias that is the same as, or comes closer to the known balance/bias. In one embodiment, the adjustment module 306 adjusts the read voltage level (or another media parameter) in the same direction as the direction of deviation indicated by the DC balance module 404.

In certain embodiments, having an indication as to which direction to adjust a read voltage threshold or other media parameter may provide a reduction in time and resources needed to identify a new adjusted read voltage level or other media parameter. If the direction in which to make a read voltage threshold was unknown, identifying a new read voltage threshold may require a labor and time intensive process of trial and error as different possible read voltage thresholds are set and then tested and then adjusted as needed. The process may be used to find a read voltage threshold that results in a re-read of the data packet substantially matching the known balance/bias.

In one embodiment, the adjustment module 306 adjusts a read voltage threshold for the storage cells of the non-volatile memory media 122 based on the direction of deviation that the DC balance module 404 determines. The adjustment module 306, in one embodiment, may adjust the read voltage threshold in the direction of deviation, away from the direction of deviation, or the like. For example, in one embodiment, the adjustment module 306 may raise the read voltage threshold from a previous read voltage threshold in response to the DC balance module 404 detecting more binary ones than expected in the known balance/bias and lower the read voltage threshold in response to fewer binary ones than expected. While the relative directions may change based on characteristics of the storage cells of the non-volatile memory media 122 and the storage scheme employed, the adjustment module 306 adjusts the read voltage threshold to correct or compensate for the difference determined by the DC balance module 404.

Because, in certain embodiments, the secondary ECC module 304 may provide stronger error correction capabilities for certain ECC code words, the DC balance module 404 may cooperate with the adjustment module 306 to determine, adjust, or set one or more media parameters, such as read voltage thresholds, based on error information for the ECC code words encoded by the secondary ECC module 304, even if other ECC code words encoded just by the primary ECC module 302 are uncorrectable. In this manner, the adjustment module 306 may adjust one or more media parameters until a number of errors in the ECC code words encoded by the primary ECC module 302 is reduced and become correctable by the primary error correcting code.

In certain embodiments, the adjustment module 306 may determine an amount to adjust the read voltage threshold or other media parameter based on an amplitude of the direction or amplitude of the difference determined by the DC balance module 404. In another embodiment, the adjustment module 306 may scale or otherwise adjust the amplitude from the DC balance module 404 and adjust the read voltage threshold the adjusted amount. For example, the adjustment module 306, in one embodiment, may adjust the read voltage threshold by several adjustment levels in a single adjustment, based on the amplitude of the direction. In a further embodiment, the adjustment module 306 may select an amount to adjust the read voltage threshold based on additional factors such as age, amount of wear, usage history, error history, or other aspects of the non-volatile memory media 122.

In another embodiment, the adjustment module 306 uses a search algorithm to determine the read voltage threshold or other media parameter based on the direction of deviation. For example, the range of voltages in the direction of deviation from the current read voltage threshold may be the search space for the search algorithm. The adjustment module 306, in one embodiment, may use a linear search, a binary search, or the like to determine the read voltage threshold. To check each step as part of the search algorithm, the read pipeline 241 may re-read the data set in response to each adjustment, and the DC balance module 404 may re-determine whether the read balance/bias of the re-read data set deviates from the known balance/bias. The DC balance module 404 may re-determine a direction of deviation for the re-read data set to further the search. The adjustment module 306 may iteratively readjust the read voltage threshold or other media parameter, as described with regard to the control loop module 410, based on the re-determined direction of deviation until the DC balance module 404 determines that the read balance/bias of a re-read data set does not deviate from the known balance/bias, or until each of the read voltage threshold levels have been tested, and/or until the data set can be corrected using the primary error correcting code, or the like.

Figure 5A:
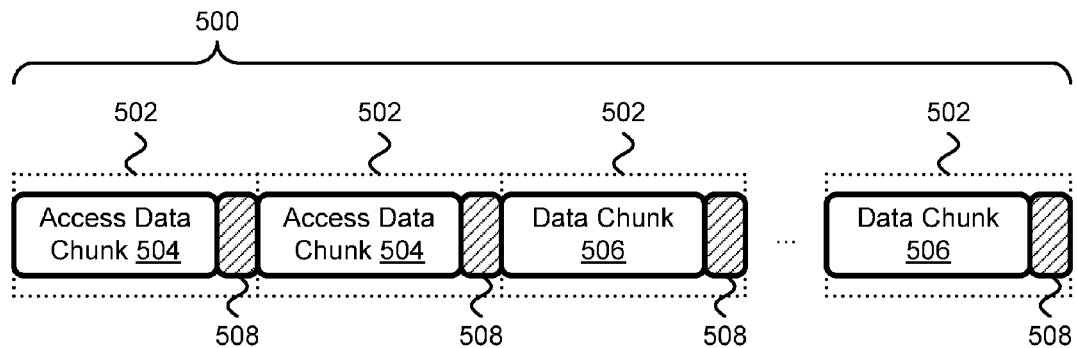
FIG. 5A is a schematic block diagram illustrating one embodiment of error correcting code (ECC) chunks of a non-volatile memory device.

FIG. 5A depicts a region 500 of the non-volatile memory media 122 including ECC chunks 502. In the depicted embodiment, each ECC chunk 502 includes an access data chunk 504 or a user data chunk 506, as well as ECC check bits 508.

In various embodiments, the depicted region 500 of the non-volatile memory media 122 may include a physical or logical page, physical or logical erase block, chip, die, plurality of chips or dies, or the like. In one embodiment, each ECC chunk 502 comprises a code word from the primary, or outer error correcting code of the primary ECC module 302. In the depicted embodiment, the primary/outer error correcting code is a systematic code, so each ECC chunk 502 includes ECC check bits 508 plus a payload or other information received by an encoder for the primary/outer error correcting code, such as an access data chunk 504 or user data chunk 506. In the depicted embodiment, the first two ECC chunks 502 of the storage region 500 comprise encoded access data chunks 504, while the remaining ECC chunks 502 of the storage region 500 comprise encoded user data chunks 506, with user data, workload data, or the like from storage clients 116.

In certain embodiments, the at least one ECC chunk 502 storing access data 504, the first two ECC chunks 502 in the depicted embodiment, may be encoded or protected by a stronger error correcting code, multiple levels of error correcting codes, or the like as described above, while the one or more ECC chunks 502 storing user data 506 may be encoded or protected by a weaker error correcting code, a single error correcting code, or the like. As described above, the access data 504 may include metadata, settings, and/or thresholds which the non-volatile memory controller 124, the non-volatile memory media controller 126, a device driver such as the SML 130, or the like may use to access (e.g., read, write, program, and/or erase) a region 500 of the non-volatile memory media 122. Access data 504 may include one or more media parameters or storage thresholds as described above, a program/erase cycle count for the region of non-volatile memory media 122, an age of the non-volatile memory media 122, a table with multiple media parameters or storage thresholds, a logical-to-physical mapping for data of a region of non-volatile memory media 122, validity metadata or a validity bitmap for data of a region of non-volatile memory media 122, or other information associated with accessing data of a region 500 of non-volatile memory media 122.

Figure 5B:
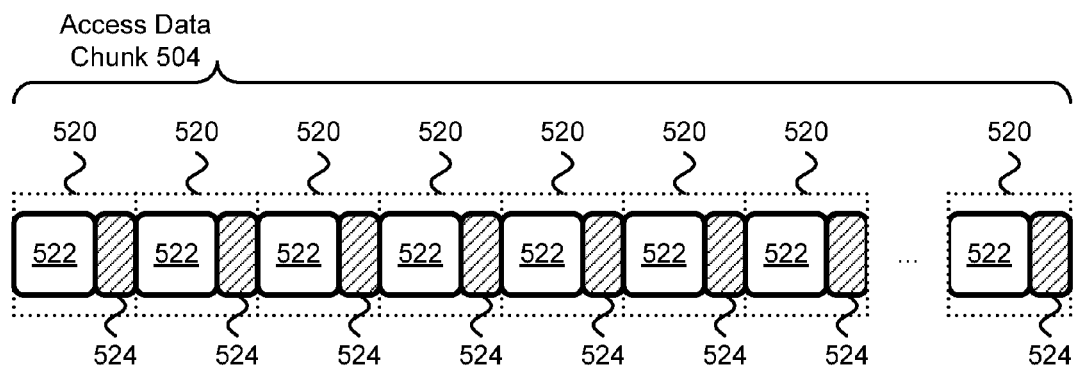
FIG. 5B is a schematic block diagram illustrating one embodiment of access data for an ECC chunk of a non-volatile memory device.

Access data 500 may be stored in one or more predefined locations in the region 500 of the non-volatile memory device 120, such as the first two ECC chunks 502 in the depicted embodiment. In certain embodiments, the access data 504 for the region 500 may comprise a media access control (MAC) header or erase block opener for the region 500. In the depicted embodiment, the first two ECC chunks 502 store access data 504 encoded with multiple error correcting codes, including the primary/outer error correcting code of the primary ECC module 302, the secondary/inner error correcting code of the secondary ECC module 304, and the repetition error correcting code of the repetition code module 406 as depicted in FIG. 5B, while the remaining ECC chunks 502 store user data 506 encoded with the primary/outer error correcting code.

In a further embodiment, the primary ECC module 302 may decode the first two ECC chunks 502 using the ECC check bits 508 of the primary/outer error correcting code, returning access data chunks 504, which include the access data encoded with at least the secondary/inner error correcting code. In another embodiment, the primary ECC module 302 may determine that the first two ECC chunks 502 are uncorrectable using the ECC check bits 508 of the primary/outer error correcting code. However, because the primary/outer error correcting code is a systematic code in the depicted embodiment, the primary ECC module 302 may return the access data chunks 504 with uncorrected errors for the use of other modules, such as the secondary ECC module 304 and/or the repetition code module 406 by simply discarding the check bits 508. In a further embodiment, because the access data chunks 504 include the access data encoded with at least the secondary/inner error correcting code, the secondary ECC module 304 and/or additional modules such as the repetition code module 406 may decode the access data chunks 504 despite errors left uncorrected by the primary ECC module 302. Access data chunks 504 are described further below with regard to FIG. 5B and FIG. 5C.

In the depicted embodiment, ECC chunks 502 containing (or encoding) data other than the access data may be encoded with the primary/outer error correcting code but not with multiple error correcting codes. In the depicted embodiment, each such ECC chunk 502 may include a user data chunk 506 and check bits 508. Because data other than the access data 504 is not encoded with multiple error correcting codes, the user data chunks 506 may include user data, workload data, other data from a storage client 116, or the like. In some embodiments, because the user data chunks 506 may not be encoded with additional error correcting codes, the user data 506 may be decoded more quickly than the encoded access data 504, so the data chunks 506 may be more suitable than the access data chunks 504 for storing user data. Using a single error correcting code for the user data 506, in certain embodiments, may conserve storage capacity of the non-volatile memory media 122, because the single error correcting code may have lower storage capacity overhead (e.g., a higher code rate, fewer check bits 508, 524, or the like).

In the depicted embodiment, two ECC chunks 502 include access data chunks 504, while the remaining ECC chunks 502 for the region 500 include user data chunks 506. In another embodiment, one, three, or more ECC chunks 502 may include access data chunks 504, with the remaining ECC chunks 502 for the region 500 including user data chunks 506.

In general, the adjustment module 306 may adjust, determine, or set one or more media parameters for the region 500 based on error information from the at least one ECC chunk 502 storing access data 504 with multiple error correcting codes, and/or based on the decoded access data 504 itself. If useful media parameters do not vary much within the region 500, than the adjustment module 306 may use error information or access data 504 from a small number of ECC chunks 502 storing access data 504 to effectively adjust media parameters affecting the remaining user data 506 in a much larger number of ECC chunks 502. Therefore, most ECC chunks 502 in the region 500 may include user data chunks 506, with the access data chunks 504 taking a small amount of the region 500. For example, in one embodiment, the region 500 may be a logical erase block with a capacity of approximately 4,000 KiB, and the access data chunks 504 may use the first two 1 KiB ECC chunks 502 for the region. In different embodiments, however, the region 500 may include a different ratio of user data chunks 506 to access data chunks 504.

FIG. 5B depicts one embodiment of an access data chunk 504. The access data chunk 504, in certain embodiments, may be substantially similar to the access data chunk 504 described above with regard to FIG. 5A. In the depicted embodiment, the access data chunk 504 includes access data 522 encoded with the secondary/inner error correcting code and a repetition error correcting code, as described above. Thus, in the depicted embodiment, the access data chunk 504 includes repeated messages 520 for the repetition error correcting code, so that each message 520 comprises a code word of the secondary/inner error correcting code of the secondary ECC module 304, both of which are also encoded by the primary/outer error correcting code described above with regard to FIG. 5A. In the depicted embodiment, the secondary/inner error correcting code is a systematic error correcting code, so each repeated message 520 includes the unencoded access data 522, plus check bits 524 for the secondary/inner error correcting code.

In one embodiment, each repeated message 520 of the access data chunk 504 may be stored on a different physical memory element, such as a chip, die, die plane, or the like. Thus, in a further embodiment, the adjustment module 306 may effectively adjust one or more media parameters for different physical memory elements of the non-volatile memory media 122 based on error information obtained by decoding the access data. For example, in a certain embodiment, the region 500 of FIG. 5A may be a logical erase block that includes physical erase blocks from eight to twenty-four different memory elements. In a further embodiment, the access data chunks 504 stored by the first two ECC chunks 502 in the region 500 may collectively include eight to twenty-four repetitions of the message 520, with each repeated message 520 stored by a different physical memory element. Although the access data 522 is encoded using three error correcting codes in the depicted embodiment, the access data 522 in a further embodiment may be encoded with any number of multiple error correcting codes, with increasing ECC strength and correspondingly wider range of adjustable media parameters.

Figure 5C:
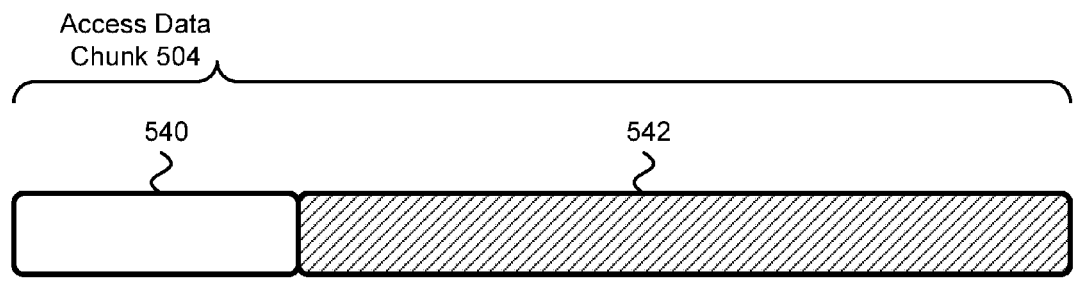
FIG. 5C is a schematic block diagram illustrating another embodiment of access data for an ECC chunk of a non-volatile memory device.

FIG. 5C depicts another embodiment of an access data chunk 504. The access data chunk 504, in certain embodiments, may be substantially similar to the access data chunk 504 described above with regard to FIG. 5A. In the depicted embodiment, the access data chunk 504 is a code word for the secondary/inner error correcting code, including access data 540 and check bits 542.

In the depicted embodiment, the access data chunk 504 includes access data 540 encoded with the secondary/inner error correcting code but without the repetition error correcting code of FIG. 5B. In one embodiment, the secondary/inner error correcting code may be a balanced code, so the access data chunk 504 includes an equal number of zero and one bit data values once encoded. In the depicted embodiment, the secondary/inner error correcting code is a systematic balanced code, so that the access data chunk 504 includes a small amount of access data 540 and a larger amount of check bits 542, providing stronger error correction and a lower code rate than the primary/outer error correcting code described with regard to FIG. 5A. The large number of check bits 542 may provide an equal number of zero and one bits for the access data chunk 504, and may also provide strong error correction. In another embodiment, the secondary/inner error correcting code may be a non-systematic balanced code. As in the depicted embodiment, a non-systematic balanced code may encode a small amount of access data 540 in a significantly larger code word 504 to provide strong error correction with a balanced code word 504. However, a non-systematic code may not embed access data 540 and check bits 542 separately in the code word 504 as shown.

Figure 6:
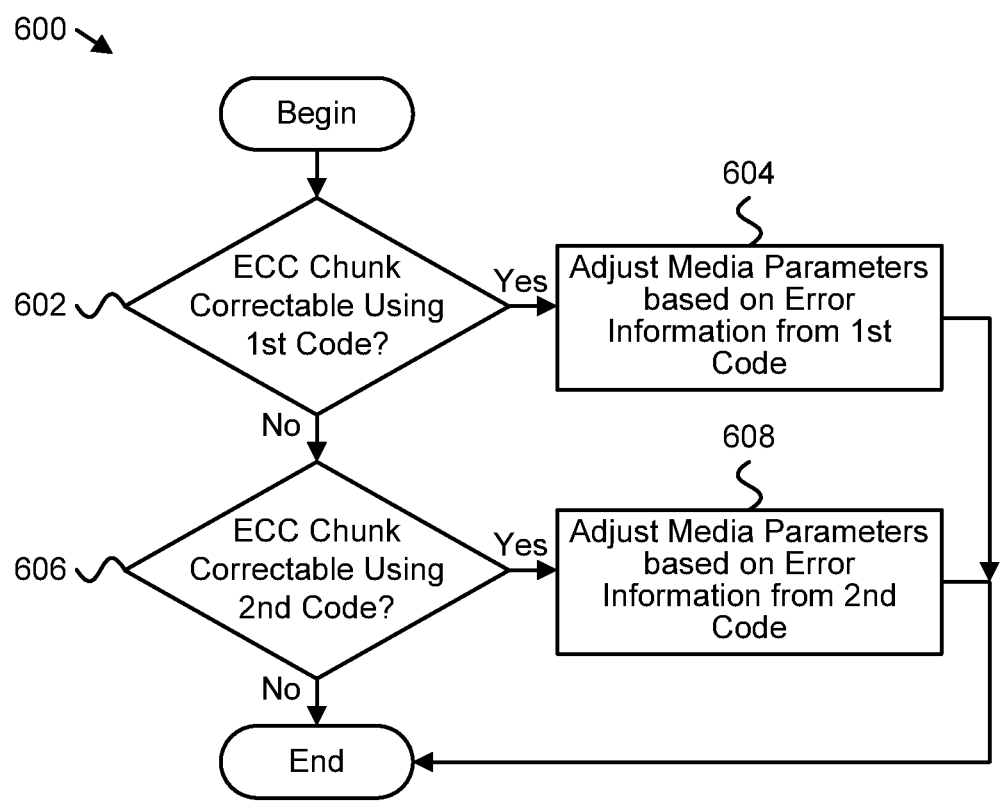
FIG. 6 is a schematic flow chart diagram illustrating one embodiment of a method for managing non-volatile media.

FIG. 6 depicts one embodiment of a method 600 for managing non-volatile media. The method 600 begins, and the primary ECC module 302 determines 602 whether at least one ECC chunk is correctable using a first error correcting code. If the at least one ECC chunk is correctable using the first error correcting code, the adjustment module 306 adjusts 604 one or more media parameters for accessing the non-volatile media 122 based on error information from the first error correcting code, and the method 600 ends. Alternatively, if the at least one ECC chunk is not correctable using the first error correcting code, the secondary ECC module 304 determines 606 whether the at least one ECC chunk is correctable using a second error correcting code different from the first error correcting code. If the at least one ECC chunk is correctable using the second error correcting code, the adjustment module 306 adjusts 608 one or more media parameters for accessing the non-volatile media 122 based on error information from the second error correcting code, and the method 600 ends. If the at least one ECC chunk is not correctable using the second error correcting code, the method 600 ends. In one embodiment, if the method 600 ends without adjusting 604, 608 media parameters, data encoded in additional ECC chunks with a weaker error correcting code may be lost. In another embodiment, however, data may still be retrieved in other ways, such as by using a higher-performance ECC decoder on a host such as computing device 110, or by copying the data from a backup.

Figure 7:
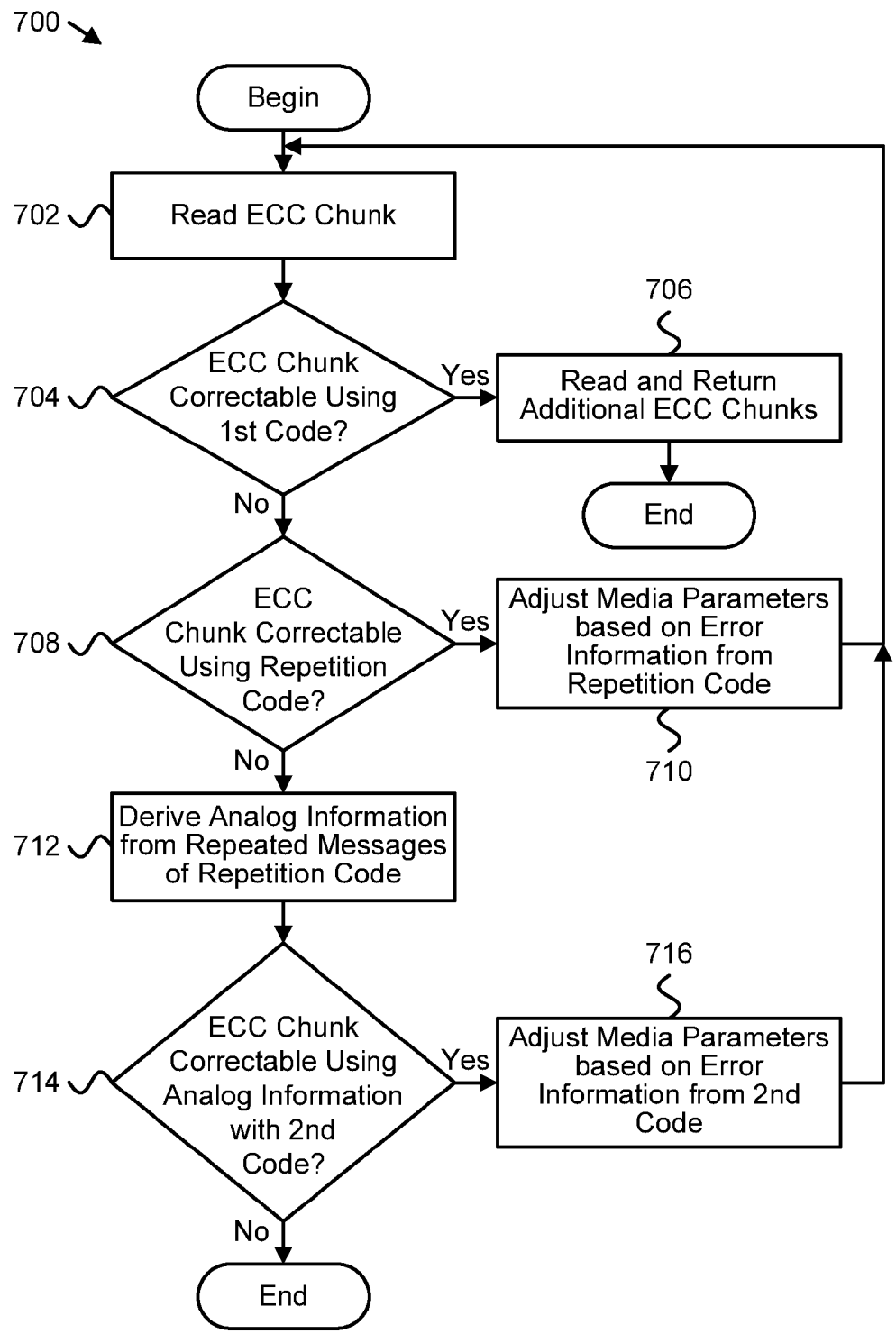
FIG. 7 is a schematic flow chart diagram illustrating another embodiment of a method for managing non-volatile media.

FIG. 7 is a schematic flow chart diagram illustrating another embodiment of a method 700 for managing non-volatile media. The method 700 begins, and the control loop module 410 reads 702 an ECC chunk. The primary ECC module 302 determines 704 whether the ECC chunk is correctable using a first error correcting code. If the ECC chunk is correctable using the first error correcting code, then the non-volatile memory device 120 reads and returns 706 data from additional ECC chunks, and the method 700 ends. If the at least chunk is not correctable using the first error correcting code, then the repetition code module 406 determines 708 whether the ECC chunk is correctable using a repetition error correcting code. If the ECC chunk is correctable using a repetition error correcting code, the adjustment module 306 adjusts 710 one or more media parameters for accessing the non-volatile media 122 based on error information from the repetition error correcting code, and the method 700 enters a new iteration; the control loop module 410 reads 702 the ECC chunk using the adjusted media parameters. If the ECC chunk is not correctable using the repetition error correcting code, the analog information module 408 derives 712 analog information from repeated messages of the repetition error correcting code.

The secondary ECC module 304 determines 714 whether the ECC chunk is correctable using a second error correcting code different from the first error correcting code. If the ECC chunk is correctable using the second error correcting code, the adjustment module 306 adjusts 716 one or more media parameters for accessing the non-volatile media 122 based on error information from the second error correcting code, and the method 700 enters a new iteration; the control loop module 410 reads 702 the ECC chunk using the adjusted media parameters. If the ECC chunk is not correctable using the second error correcting code, then the method 700 ends. In one embodiment, if the method 700 ends because the ECC chunk is not correctable using the second error correcting code, then data encoded in additional ECC chunks with a weaker error correcting code may be lost. In another embodiment, however, data may still be retrieved in other ways, such as by using a higher-performance ECC decoder on a host such as computing device 110, or by copying the data from a backup.

Figure 8:
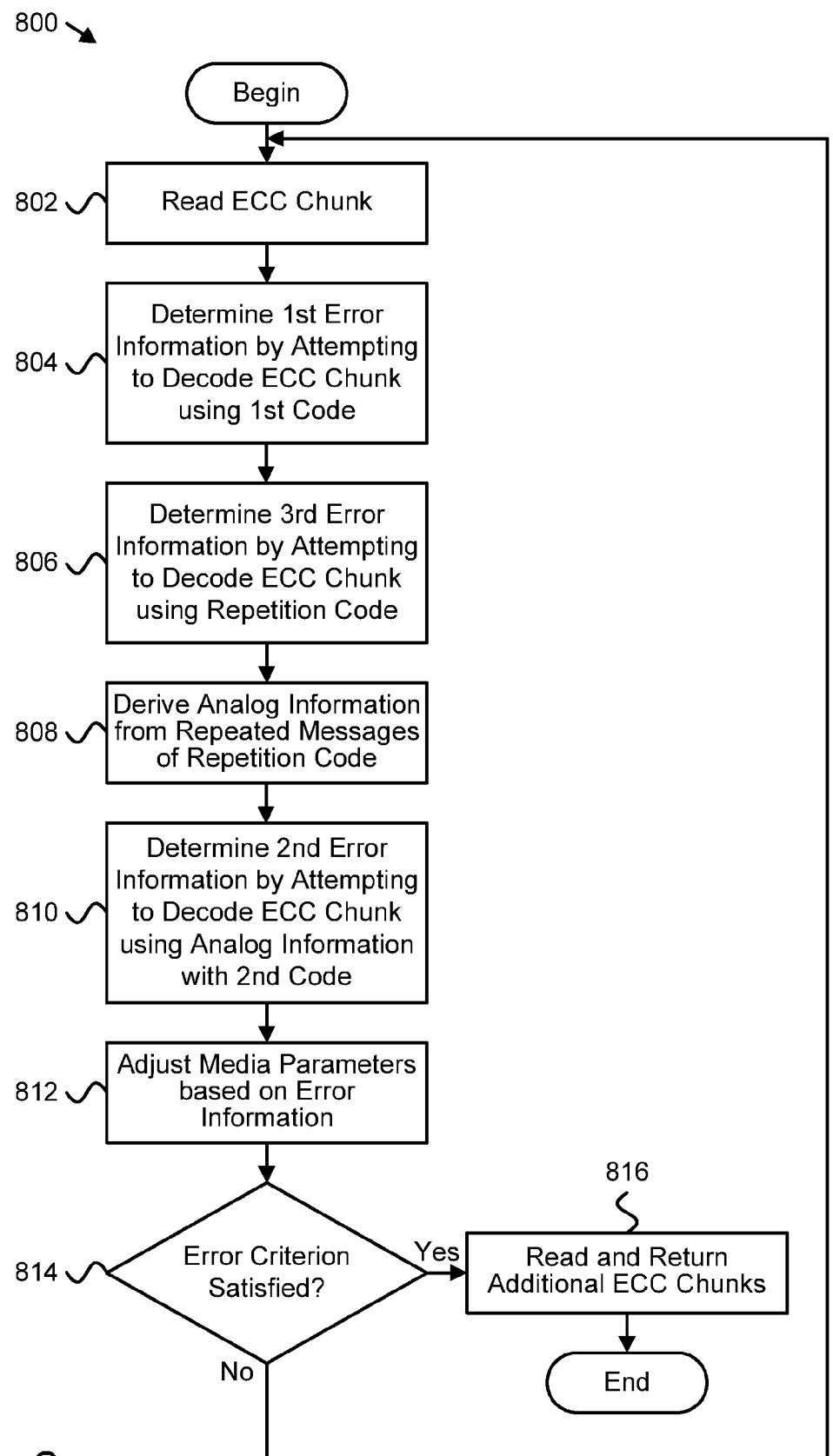
FIG. 8 is a schematic flow chart diagram illustrating yet another embodiment of a method for managing non-volatile media.

FIG. 8 depicts yet another embodiment of a method 800 for managing non-volatile media. The method 800 begins, and the control loop module 410 reads 802 an ECC chunk. The primary ECC module 302 determines 804 first error information by attempting to decode the ECC chunk using the first error correcting code. The repetition code module 406 determines 806 third error information by attempting to decode the ECC chunk using a repetition error correcting code. The analog information module 408 derives 808 analog information from repeated messages of the repetition error correcting code. The secondary ECC module 304 determines 810 second error information by attempting to decode the ECC chunk using the analog information with a second error correcting code different from the first error correcting code. The adjustment module 306 adjusts 812 media parameters based on error information, which includes the first error information, the second error information and the third error information. The control loop module 410 determines 814 if an error criterion is satisfied. If the error criterion is satisfied, then the non-volatile memory device 120 reads and returns 816 data from additional ECC chunks, and the method 800 ends. If the error criterion is not satisfied, then the method 800 enters a new iteration, and the control loop module 410 reads 802 the ECC chunk using the adjusted media parameters.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
    determining whether a first error correcting code (ECC) code word of a non-volatile storage device is correctable using a first error correcting code;
    determining whether a second ECC code word is correctable using a second error correcting code in response to determining that the first ECC code word is uncorrectable using the first error correcting code; and
    adjusting one or more media parameters for accessing a non-volatile medium of the non-volatile storage device based on error information, in response to determining that the second ECC code word is correctable using the second error correcting code, the error information comprising information from a decoder for the second error correcting code.

2. The method of claim 1, further comprising
    determining whether the second ECC code word is correctable using a repetition error correcting code; and
    deriving analog information from repeated messages of the repetition error correcting code in response to determining that the second ECC code word is uncorrectable using the repetition error correcting code, wherein determining that the second ECC code word is correctable using the second error correcting code comprises using the analog information to inform the decoder for the second error correcting code.

3. The method of claim 1, wherein the second error correcting code comprises a repetition error correcting code.

4. The method of claim 1, wherein the decoder for the second error correcting code comprises a soft-decision decoder.

5. The method of claim 1, wherein the second error correcting code comprises a balanced code and the error information comprises information indicating a balance of the second ECC code word.

6. The method of claim 1, further comprising iteratively reading the second ECC code word from the non-volatile storage device using the adjusted media parameters, determining the error information, and adjusting one or more media parameters, until the first ECC code word is correctable using the first error correcting code.

7. The method of claim 1, wherein the one or more media parameters comprise one or more read voltage thresholds.

8. The method of claim 1, wherein data of the second ECC code word comprises a header for one or more additional ECC code words of the non-volatile storage device.

9. The method of claim 1, wherein the second ECC code word is nested within the first ECC code word such that the first and second ECC code words provide error protection for the same data.

10. The method of claim 1, wherein the first ECC code word and the second ECC code word provide error protection for different data.

11. An apparatus comprising:
    a secondary ECC module configured to decode at least one error correcting code (ECC) block of a non-volatile memory device using a secondary error correcting code;
    an adjustment module configured to determine one or more media parameters based on decoding the at least one ECC block, the one or more media parameters for reading one or more additional ECC blocks from the non-volatile memory device; and
    a primary ECC module configured to decode one or more additional ECC blocks of the non-volatile memory device using a primary error correcting code, the one or more additional ECC blocks is read by using the one or more media parameters.

12. The apparatus of claim 11, wherein the at least one ECC block stores access data comprising the one or more media parameters.

13. The apparatus of claim 11, wherein the adjustment module is configured to determine the one or more media parameters based on error information determined by the secondary ECC module from decoding the at least one ECC block.

14. The apparatus of claim 11, wherein the secondary ECC module is configured to decode the at least one ECC block using a soft-decision decoder with the secondary error correcting code.

15. The apparatus of claim 11, wherein the secondary error correcting code comprises a balanced code and the adjustment module is configured to determine the one or more media parameters based on error information indicating a balance of the at least one ECC block.

16. The apparatus of claim 11, further comprising a control loop module configured to iteratively read the at least one ECC block from the non-volatile memory device using adjusted media parameters until the secondary ECC module decodes the at least one ECC block, the adjustment module configured to determine the one or more media parameters based on the adjusted media parameters.

17. The apparatus of claim 11, wherein the one or more media parameters comprise one or more read voltage thresholds.

18. The apparatus of claim 11, wherein data of the at least one ECC block comprises a media access control header for the one or more additional ECC blocks of the non-volatile memory device, the adjustment module configured to determine the one or more media parameters at least partially based on the data of the media access control header.

19. An apparatus comprising:
    means for determining whether an error correcting code (ECC) chunk is correctable using a repetition error correcting code;
    means for deriving analog information from repeated messages of the repetition error correcting code in response to determining that the ECC chunk is uncorrectable using the repetition error correcting code; and
    means for determining whether the ECC chunk is correctable using a second error correcting code, wherein the analog information is used to inform a decoder for the second error correcting code.

20. The apparatus of claim 19, further comprising:
means for obtaining error information by decoding the ECC chunk using the second error correcting code in response to determining that the ECC chunk is uncorrectable using the repetition error correcting code; and
means for adjusting one or more media parameters for accessing a non-volatile medium of a non-volatile recording device based on the error information.

* * * * *